(12) United States Patent
Misawa et al.

(10) Patent No.: US 7,983,557 B2
(45) Date of Patent: Jul. 19, 2011

(54) CAMERA AND LENS UNIT

(75) Inventors: Atsushi Misawa, Asaka (JP); Akihisa Yamazaki, Asaka (JP); Soichiro Nakao, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 929 days.

(21) Appl. No.: 11/798,235

(22) Filed: May 11, 2007

(65) Prior Publication Data

US 2007/0268371 A1 Nov. 22, 2007

(30) Foreign Application Priority Data

May 12, 2006 (JP) ................................. 2006-134459

(51) Int. Cl.
*G03B 17/02* (2006.01)
(52) U.S. Cl. ...................................... 396/541; 396/535
(58) Field of Classification Search .................. 396/360, 396/529, 71, 373–376, 541; 348/207.99, 348/231.7, 218.1, 373, 211.8
See application file for complete search history.

(56) References Cited

U.S. PATENT DOCUMENTS

| | | | | |
|---|---|---|---|---|
| 2,529,905 | A * | 11/1950 | Berssenbrugge | 396/544 |
| 5,801,919 | A * | 9/1998 | Griencewic | 361/679.26 |
| 5,917,545 | A * | 6/1999 | Kowno et al. | 348/231.9 |
| 6,272,290 | B1 * | 8/2001 | Mogamiya | 396/59 |
| 6,525,767 | B2 * | 2/2003 | Saito et al. | 348/231.7 |
| 6,864,911 | B1 * | 3/2005 | Zhang et al. | 348/42 |
| 7,042,500 | B1 * | 5/2006 | Niikawa | 348/211.4 |
| 7,102,686 | B1 * | 9/2006 | Orimoto et al. | 348/375 |

FOREIGN PATENT DOCUMENTS

| | | | |
|---|---|---|---|
| JP | 8186768 A | | 7/1996 |
| JP | 9043717 A | | 2/1997 |
| JP | 2000-187268 A | | 7/2000 |
| JP | 2001145277 A | | 5/2001 |
| JP | 2002232822 A | | 8/2002 |
| JP | 2003060962 A | * | 2/2003 |
| JP | 2003158648 A | | 5/2003 |
| JP | 2004064389 A | | 2/2004 |
| JP | 2005175854 A | | 6/2005 |

OTHER PUBLICATIONS

Japanese Office Action, corresponding to Application No. 2006-134459, dated Aug. 3, 2010.

* cited by examiner

*Primary Examiner* — W. B. Perkey
*Assistant Examiner* — Noam Reisner
(74) *Attorney, Agent, or Firm* — Sughrue Mion, PLLC

(57) ABSTRACT

A camera consists of a first unit and a second unit removably connectable to the first unit. The first unit is provided with an imaging section including an optical system and an imaging device, that enables to capture high-quality images. The first unit is formed with a grip portion for holding and handling the camera as a combination of the first unit and the second unit. The second unit is provided with a driving device including a CPU, a lens driver circuit, a stop driver circuit and a timing generator, and a second imaging section including an optical system and an imaging device, that enables to capture relatively low-quality images. While the second unit is connected to the first unit, the driving device drives the imaging section of the first unit. While the second unit is not connected to the first unit, the driving device drives the imaging section of the second unit.

5 Claims, 20 Drawing Sheets

CAMERA AND LENS UNIT

FIELD OF THE INVENTION

The present invention relates to a lens unit and a camera consisting of a first unit and a second unit that is detachably attachable to the first unit, wherein the first unit has an optical system and an imaging device mounted therein, and the second unit is provided with a circuit for driving the optical system and the imaging device of the first unit, and processing and recording data of images captured by the imaging device.

BACKGROUND OF THE INVENTION

Digital cameras are widely used, which convert an optical image of a subject as captured through an imaging device like a CCD image sensor, to digital image data and record the image data in a recording medium like a memory card. A lens-interchangeable digital camera has recently been suggested, for example by Japanese Laid-open Patent Application No. 2000-187268, wherein a lens unit containing an optical system and an imaging device is detachably attachable to a camera body. Since the imaging device is mounted in combination with the optical system in the lens unit, this kind of lens-interchangeable digital camera has advantages in that the user can select a suitable lens unit depending upon the scene to shot, that it is unnecessary to adjust position of the optical system to the imaging device at the interchange of the lens unit, and that the imaging device is always protected from dusts.

However, since the prior lens-interchangeable digital camera is simply divided into the lens unit served as an imaging section and the camera body served as an image processing, recording and displaying section, the usage of the camera body without the lens unit is confined.

Also because a grip of the prior lens-interchangeable digital camera is integrally formed with the camera body, the grip is not always optimum for any kinds of interchangeable lens units whose size and shape are variable. Generally, a large grip is desirable for a large lens unit, for the sake of steady gripping or holding of the camera.

SUMMARY OF THE INVENTION

In view of the foregoing, a primary object of the present invention is to provide a camera that widens the range of usage of a second unit having an image recording function.

Another object of the present invention is to provide a camera that ensures stable gripping with any kind of a first unit having an imaging section.

Still another object of the present invention is to provide a lens unit having a gripping function.

Yet another object of the present invention is to provide a camera to which the lens unit is attachable for capturing high-quality images.

According to the present invention, a camera comprises a first unit comprising a first imaging section; and a second unit removably connectable to the first unit, the second unit comprising a driving device for driving the first imaging section to capture images while the first unit is connected to the second unit, a second imaging section that is driven by the driving device to capture images while the first unit is not connected to the second unit, and a device for recording data of images as captured by the first and second imaging sections in a recording medium.

As being provided with the imaging section, the second unit is usable as an independent camera without the first unit, so the utility of the second unit is improved.

While the second unit is connected to the first unit, a light receiving member, e.g. a taking lens, of the second imaging section is preferably covered up with a portion of the first unit, and is thus protected from being stained or damaged.

Preferably, the second unit further comprises a connection detector for detecting that the second unit is connected to the first unit, and a switching device for connecting the driving device to the first imaging section when the connection detector detects the connection between the second unit and the first unit, or to the second imaging section when the connection detector detects that the second unit is disconnected from the first unit.

Preferably, the first unit further comprises a first operating device manually operated to enter operational signals, and the second unit further comprises a second operating device manually operated to enter operational signals, and a second switching device for feeding the driving device with the operational signals from the first operating device while the first unit is connected to the second unit, or with the operational signals from the second operating device while the first unit is not connected to the second unit.

According to a preferred embodiment of the camera of the present invention, the first unit is provided with a grip portion for holding and handling the camera with high stability.

As being formed on the first unit, the grip portion may have such a size and a shape which are well balanced with a lens barrel of the first unit, whose size and shape may vary from one type to another.

According to an embodiment that improves compactness of the first unit, the grip portion is formed integrally with a movable portion that is movable between a closed position placed right behind a lens barrel having the first imaging section mounted therein, and an open position displaced from behind the lens barrel to one side of the lens barrel.

According to another embodiment, the grip portion is formed integrally with a member that is located around a gravity center of the first unit or a gravity center of the camera as a combination of the first unit and the second unit. Thereby, stability in holding the camera is still more improved.

In a preferred embodiment of the present invention, the camera has a driving device for driving the first imaging section to capture images while the first unit having the first imaging section is attached, a second imaging section that is driven by the driving device to capture images while the first unit is not attached, and a device for recording data of the images captured by the first and second imaging sections.

A lens unit of the present invention includes an imaging section for capturing images, a base body to which the imaging section is attached, a grip portion provided on the base body, and an attaching section provided to the base body.

The camera unit is removably attached to the attaching section, and processes a signal of the image captured by the imaging section and records it in a recording medium.

According to the camera of the present invention, the second unit (camera unit) is usable as an independent camera when the second unit is not connected to the first unit (lens unit), so the camera can be widely used. Moreover, since the grip portion is formed on the first unit, the size and shape of the grip portion can be determined according to the size and shape of the first unit, which provides the user with optimum gripping.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
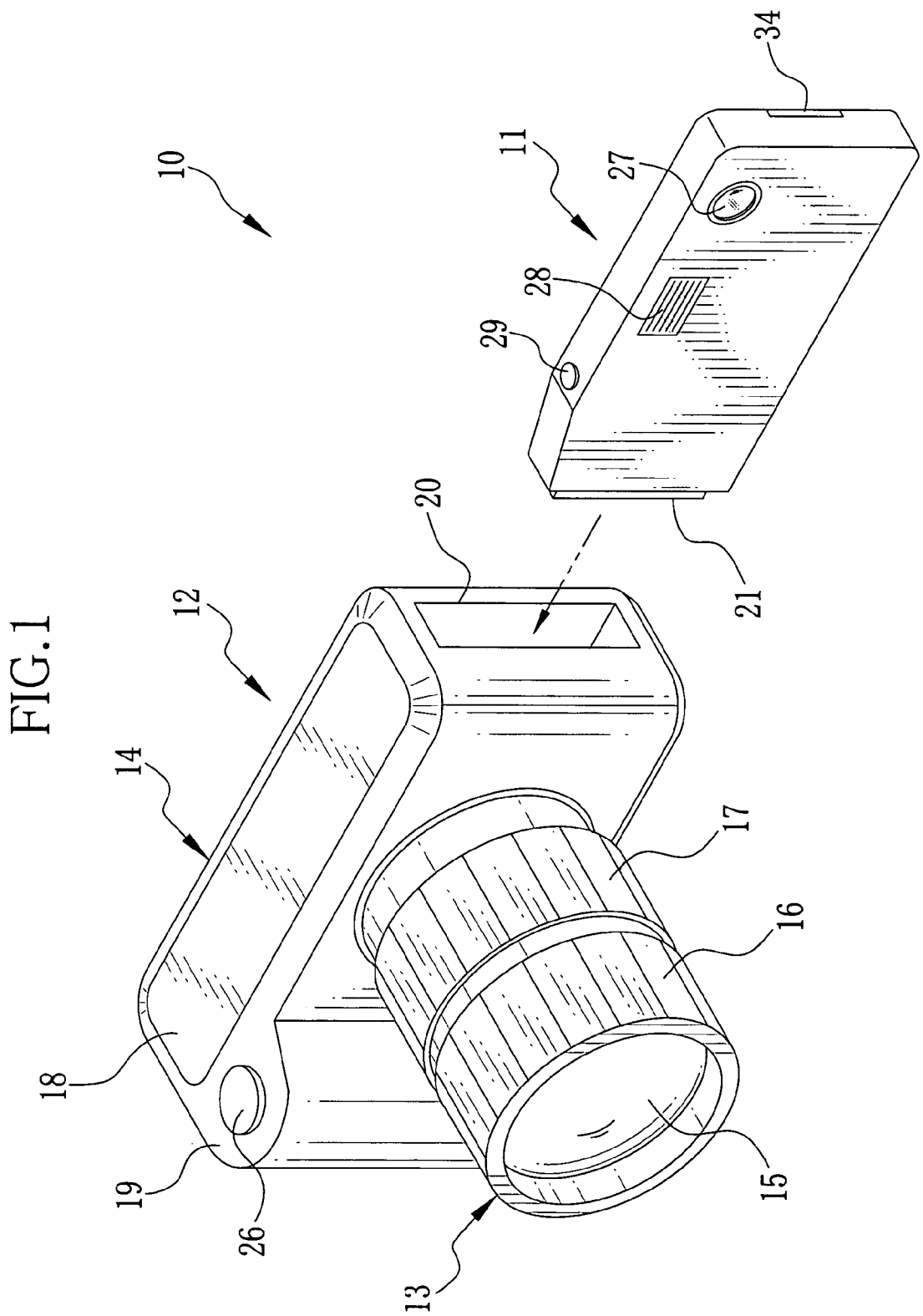
FIG. 1 is a front perspective view of a camera according to a first embodiment of the present invention.
Figure 2:
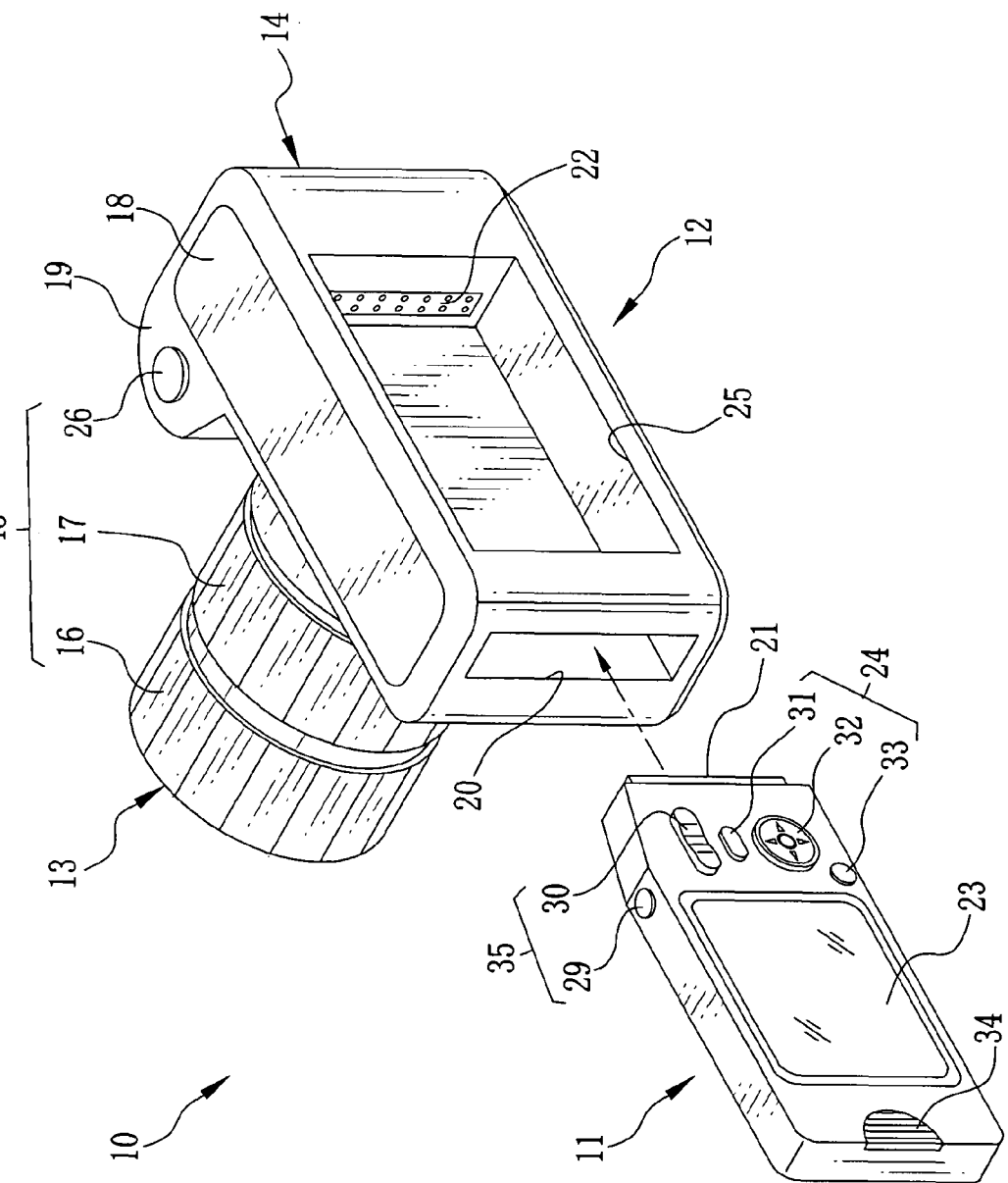
FIG. 2 is a rear perspective view of the camera according to the first embodiment.

In FIGS. 1 and 2, a camera 10 according to a first embodiment consists of a first unit 12 (lens unit) and a second unit 11 (camera body) detachably attachable to the first unit 12. The first unit 12 consists of a cylindrical lens barrel 13 having an optical system 40 and an imaging device 44 mounted therein, see FIG. 3, and a base body 14 affixed to the lens barrel 13.

The lens system is superior in optical performance (for example, aberration, resolution, and open f number). The imaging device 44 has many pixels, so use of the first unit 12 allows the user to capture high-quality images.

A taking lens 15 of the optical system 40 is exposed on a front face of the lens barrel 13, and a rear end of the lens barrel 13 is connected to the base body 14. A focusing ring 16 and a zooming ring 17 are mounted on a peripheral surface of the lens barrel 13. The focusing ring 16 permits manual focusing by the user, whereas the zooming ring 17 permits manual zooming by the user.

Figure 4:
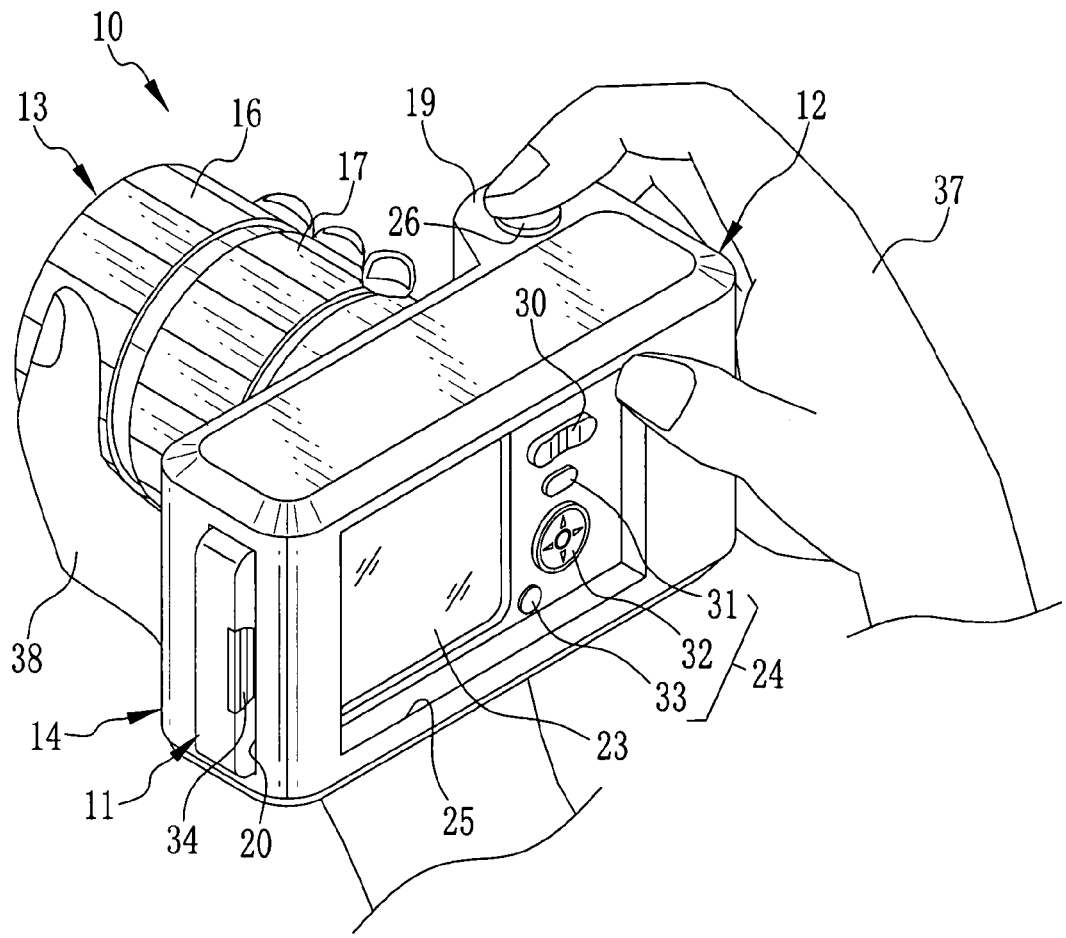
FIG. 4 is a rear perspective view of the camera in a condition used as a single-reflex digital camera.

The base body 14 consists of a second unit connecting portion 18 of a substantially rectangular prism shape, and a grip portion 19 protruding forward from one end of the second unit connecting portion 18. A slot or inlet 20 is formed through the other end of the second unit connecting portion 18, for inserting the second unit 11 into the second unit connecting portion 18. A connector 22 is provided inside the second unit connecting portion 18 so that a connector 21 of the second unit 11 is connected to the connector 22 as the second unit 11 is inserted through the slot 20 into the second unit connecting portion 18. An opening 25 is formed through a rear wall of the base body 14 so as to expose a monitor or image display device 23 and an operating section 24 of the second unit 11, as the second unit 11 is fit in the second unit connecting portion 18, as shown in FIG. 4.

A shutter button 26 is provided on a top surface of the grip 19, and a battery 36 (see FIG. 3) is removably loaded in the grip 19. The grip 19 has such a size and a shape that are well-balanced to the size and the shape of the lens barrel 13.

The second unit 11 has a substantially rectangular prism shape having a small thickness between its front and rear sides. A taking lens 27 and a flash device 28 are exposed to the front of the second unit 11, whereas a shutter button 29 is provided on a top surface of the second unit 11. On the rear side of the second unit 11 are provided the monitor 23, e.g. an LCD panel, a zooming button 30, a menu button 31, a cursor button 32 and a power button 33. The connector 21 to be connected to the connector 22 of the first unit 12 is provided on one end of the second unit 11, while an anti-slip member 34 is provided on the other end of the second unit 11. The anti-slip member 34 is served as a lug or gripe for the user to draw the second unit 11 out of the first unit 12.

As being connected to the first unit 12, the second unit 11 is used as a component of a full-dressed single-reflex digital camera. The second unit 11 can also be used as an independent compact digital camera, without being connected to the first unit 12. The shutter button 29 and the zooming button 30 constitute an operating section 35 for taking pictures by the second unit 11 as the independent digital camera. On the other hand, the menu button 31, the cursor button 32 and the power button 33 constitute the operating section 24 for displaying reproduced images, setting various operations and data, and turning the power on or off. The operating section 24 works while the second unit 11 is used alone and also while the second unit 11 is connected to the first unit 12. The menu button 31 is operated to display a menu screen on the monitor 23 and decide on a chosen content. The cursor button 32 is operated to move a cursor on the menu screen.

The connectors 21 and 22 are formed as connecting mechanisms which consist of a number of pairs of male pins and female pins. By pushing the connector 22 into the connector 21, the connection between them is fastened, and the second unit 11 is connected to the first unit 12 mechanically and electrically as well. Thus, picture signals and control signals are transferred between the second unit 11 and the first unit 12 through the connectors 21 and 22.

Figure 3:
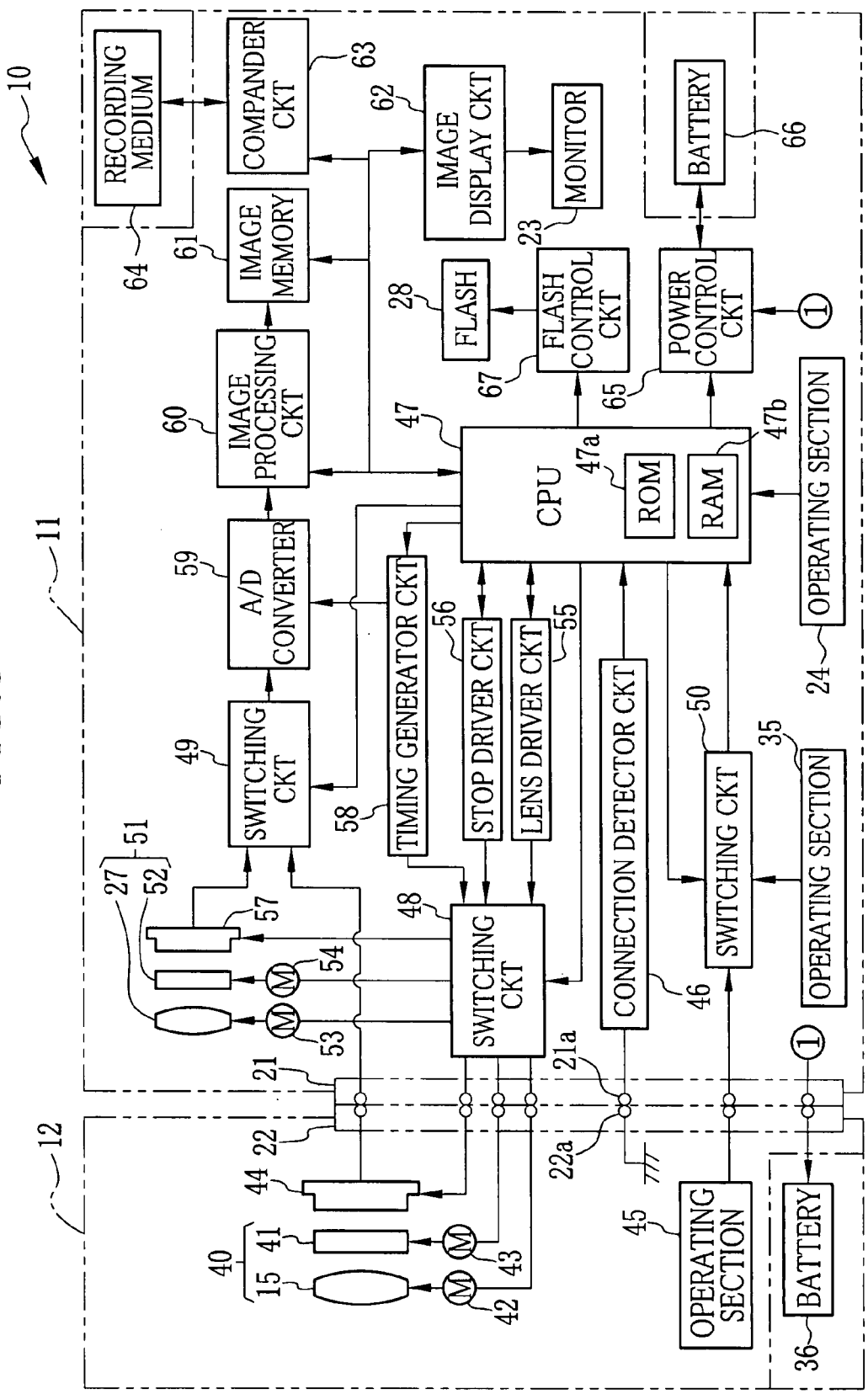
FIG. 3 is a block diagram illustrating an internal structure of the camera according to the first embodiment.

FIG. 3 shows the interior of the camera 10. The optical system 40 of the first unit 12 consists of the taking lens 15 and a stop 41 for adjusting the light volume of the optical image of the subject. The taking lens 15 consists of lens groups constituting a focus lens and a zoom lens. A lens motor 42 and an iris motor 43 are connected to the taking lens 15 and the stop 41, respectively. The lens motor 42 and the iris motor 43 adjust position of the taking lens 15 and aperture size of the stop 41 according to control signals fed from the second unit 11 through the connectors 21 and 22.

The imaging device 44 is a two-dimensional image sensor of CCD or CMOS type that photo-electrically converts the optical image of the subject, which is formed through the optical system 40, to an electric picture signal. The imaging device 44 carries out the imaging for producing the picture signal, based on control signals fed from the second unit 11 through the connectors 21 and 22. The picture signal outputted from the imaging device 44 is fed to the second unit 11 through the connectors 21 and 22.

An operating section 45 consists of the focusing ring 16, the zooming ring 17 and the shutter button 26. Operational signals from the operating section 45 are fed to the second unit 11 through the connectors 21 and 22. One contact 22a of the connector 22 is grounded.

In the second unit 11, a connection detector circuit 46 is connected to a contact 21a of the connector 21. As the connectors 21 and 22 are connected to each other, the contact 21a comes in touch with the contact 22a, so a ground level voltage is given to the contact 21a. Upon detection of the ground level, the connection detector circuit 46 determines that the second unit 11 is connected to the first unit 12, and outputs a detection signal to a main controller (CPU) 47.

The CPU 47 is provided with a ROM 47a storing a control program and a RAM 47b for storing work data temporarily. The CPU 47 controls respective components of the second unit 11 based on the control program. The CPU 47 also controls switching circuits 48, 49 and 50 based on the detection signal from the connection detector circuit 46, to switch over between driving the imaging section of the first unit 12, which consists of the optical system 40, the motors 42 and 43 and the imaging device 44, and driving an imaging section of the second unit 11.

The imaging section of the second unit 11 consists of an optical system 51, a lens motor 53, an iris motor 54 and an imaging device 57. The optical system 51 consists of the taking lens 27 and a stop 52 for adjusting light volume of an optical image of the subject formed through the taking lens 27. The taking lens 27 is composed of lens groups that constitute a focus lens and a zoom lens. The lens motor 53 and the iris motor 54 are connected to the taking lens 27 and the stop 52 respectively. The lens motor 53 adjusts the position of the taking lens 27 according to a control signal which is fed from a lens driver circuit 55 through the switching circuit 48, while the iris motor 54 adjusts the aperture size of the stop 52 according to a control signal which is fed from a stop driver circuit 56.

The CCD 57 is a two-dimensional image sensor of CCD or CMOS type that effects photoelectric conversion on the optical image of the subject entering through the optical system 51, to produce a picture signal. The CCD 57 carries out imaging to output the picture signal, based on control signals fed from a timing generator 58 through the switching circuit 48. The picture signal outputted from the CCD 57 is fed through the switching circuit 49 to an A/D converter 59.

The imaging section of the second unit 11 includes the optical system 51 and the imaging device 57. The imaging section of the second unit 11 captures lower-quality images than the imaging section of the first unit 12. Therefore, the second unit 11 is independently used when low-quality images are sufficient for the user. For capturing high-quality images, the first unit 12 is attached to the second unit 11 and imaging section of the first unit 12 is preferentially used.

The switching circuit 50 is fed with operational signals generated from the operating section 45 of the first unit 12 or ones generated from the operating section 35 of the second unit 11. The switching circuit 50 is controlled by the CPU 47, so that the switching circuit 50 accepts the operational signals from the operating section 45 and transfers these signals to the CPU 47 while the connection detector circuit 46 detects that the first unit 12 is connected to the second unit 11. While the connection detector circuit 46 does not detects the connection of the first unit 12, the switching circuit 50 accepts the operational signals from the operating section 35 of the second unit 11, and transfers these signals to the CPU 47. The CPU 47 drives the respective sections to work based on the operational signals from the switching circuit 50.

The switching circuit 48 switches the way to feed the control signals from the lens driver circuit 55, the lens driver circuit 55 and the timing generator circuit 58 either to the motors 42 and 43 and the imaging device 44 of the first unit 12, or to the motors 53 and 54 and the CCD 57 of the second unit 11. The switching circuit 48 is controlled by the CPU 47, so that the switching circuit 48 feeds the control signals to the motors 42 and 43 and the imaging device 44 while the connection detector circuit 46 detects the connection of the first unit 12. While the connection detector circuit 46 does not detects the connection of the first unit 12, the switching circuit 48 feeds the control signals to the motors 53 and 54 and the CCD 57.

The switching circuit 49 is fed with the picture signal outputted from the imaging device 44 of the first unit 12 or one outputted from the CCD 57 of the second unit 11. The switching circuit 49 is controlled by the CPU 47, so that the switching circuit 49 feeds the picture signal from the imaging device 44 to the A/D converter 59 while the connection detector circuit 46 detects the connection of the first unit 12. While the connection detector circuit 46 does not detects the connection of the first unit 12, the switching circuit 49 feeds the picture signal from the CCD 57 to the A/D converter 59.

Thus, the CPU 47 controls switching so that the imaging section of the first unit 12 is driven based on the operational signal from the operating section 45 of the first unit 12 while the first unit 12 is connected to the second unit 12, and that the imaging section of the second unit 11 is driven based on the operational signal from the operating section 35 of the second unit 11 while the first unit 12 is not connected to the second unit 11.

The A/D converter 59 converts the analog picture signal, which is fed from the imaging device 44 or 57 through the switching circuit 49, to a digital signal of a predetermined bit number, and feeds the converted digital signal to an image processing circuit 60. The A/D converter 59 is fed with a clock signal from the timing generator circuit 58, to synchronize with the operation of the imaging device 44 or 57. It is preferable to provide an analog signal processing circuit for correlated double sampling and gain correction.

The image processing circuit 60 processes the digital picture signal for color compensation, YC-conversion, gamma correction, edge correction, white-balance correction and other image correction processes, and writes the processed digital picture signal as image data in an image memory 61.

Until a shooting command is given by operating the shutter button 26 or 29, the image data sequentially written in the image memory 61 is simultaneously fed to an image display circuit 62 to display moving camera-through images of the subject on the monitor 23, so the user may use the monitor 23 as an electronic viewfinder.

A compander circuit 63 compresses the image data as written in the image memory 61 according to a predetermined compression format, e.g. JPEG format, when the shutter button 26 or 29 is operated to give a shooting command. The compressed image data is written in a recording medium 64 like a memory card that is detachably attachable to the second unit 11. When an image reproduction command is entered through the operating section 24, the compander circuit 63 also reads out the image data from the recording medium 64 and decompresses the read image data if it is compressed, and feeds it to the image display circuit 62 to display a reproduced image on the monitor 23. The image data may be stored in a not-shown built-in memory in place of the image memory 64.

The CPU 47 is connected to a power control circuit 65, to control power supply from a battery 66 that is removably loaded in the second unit 11. The battery 66 starts supplying electric power to the respective components as the power button 33 is turned on, and stops the power supply as the power button 33 is turned off.

The power control circuit 65 also causes the battery 36 of the first unit 12 to supply electric power to the second unit 11 through the connectors 21 and 22, if the first unit 12 as connected to the second unit 11 is so large that the power from the battery 66 alone is not enough for supplying all elements including those of the first unit 12. Thus, the battery 36 of the first unit 12 is used as a subsidiary of the battery 66 of the second unit 11. It is alternatively possible to configure that the power control circuit 65 stops supplying from the battery 66 of the second unit 11 and starts supplying only from the battery 36 of the first unit 12 when the connection detector circuit 46 detects the connection of the first unit 12. This configuration prevents the battery of the second unit 11 from being used up by the first unit 12.

The CPU 47 is also connected to a flash control circuit 67 for driving the flash device 28 to emit a flashlight synchronously with a shooting operation.

Now the operation of the camera 10 will be described.

To use the camera 10 as a single-reflex digital camera, the second unit 11 is inserted through the slot 20 into the first unit 12 to connect the connectors 21 and 22 electrically. Then, as shown in FIG. 4, the front of the second unit 11, where the taking lens 27 is served as a light receiving member for the imaging section, is covered with the base body 14 of the first unit 12 and thus protected from being stained or damaged. The monitor 23 and the operating section 24, which are provided on the rear side of the second unit 11, are exposed through the opening 25. Inside the second unit 11, the CPU 47 controls the switching circuits 48 and 49 so that the first unit 12 carries out the imaging of the subject and transfers the picture signal to the second unit 11, while the second unit 11 carries out the image processing and recording processes. The CPU 47 also controls the switching circuit 50 so as to validate or activate the operating section 45 of the first unit 12 and invalidate or deactivate the operating section 35 of the second unit 11.

As the user holds the grip 19 by the right hand 37 and the lens barrel 13 by the left hand 38, the camera 10 is held properly and stably, so the camera shake is reduced. The monitor 23 displays the images of the subject taken through the first unit 12 sequentially as the moving camera-through images. While looking at the camera-through images, the user makes focusing and zooming respectively by turning the focusing ring 16 and the zooming ring 17 with the left hand 38, and presses the shutter button 26 by the index finger of the right hand 37. When the shutter button 26 is pressed down, the picture signal as captured through the first unit 12 is recorded as image data of one frame in the image memory 64. The user can also operates the operating section 24 by the thumb of the right hand 37 while holding the grip 19, as shown in FIG. 4. So the image data just recorded in the image memory 64 may be instantly reproduced on the monitor 23.

The camera 10 allows using the second unit 11 as an independent camera separately from the first unit 12. To permit detaching the second unit 11 from the first unit 12, the anti-slip member 34 is protruded out of the slot 20, so the user can pinch the second unit 11 at the anti-slip member 34 and draw the second unit 11 out of the first unit 12. As the second unit 11 is separated from the first unit 12, the CPU 47 of the second unit 11 controls the switching circuits 48 and 49 so that the second unit 11 carries out the imaging of the subject, the image processing, the image recording and any other operations. Simultaneously, the CPU 47 controls the switching circuit 50 to validate or activate the operating section 24 of the second unit 11. Thus, the monitor 23 displays the images captured by the second unit 11 sequentially as the camera-through images.

Figure 5:
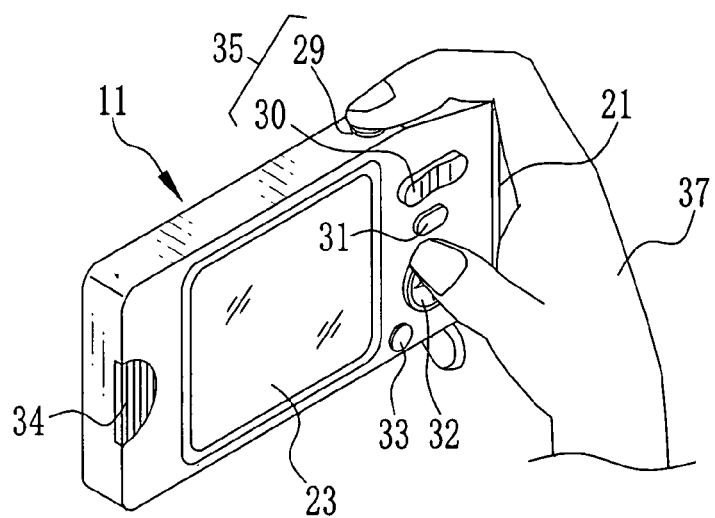
FIG. 5 is a rear perspective view of a second unit of the camera, in a condition used as an independent camera.

As shown in FIG. 5, the user can operate the zooming button 30 by the thumb of the right hand 37 and press the shutter button 29 by the index finger of the right hand 37, while holding the second unit 11 at its right side portion by the right hand 37. When the shutter button 29 is pressed down, the picture signal captured through the imaging section of the second unit 11 is recorded as image data of one frame in the image memory 64. The user can also operate the operating section 24 by the thumb of the right hand 37, to display the captured image on the monitor 23.

As described so far, the second unit 11 of the camera 10 is not only usable in connection with the first unit 12 for constituting the single-reflex digital camera, but also usable independently as a compact digital camera, widening the utility of the second unit 11. Since the grip 19 of the camera 10 is formed on the first unit 12, it is possible to design the size and shape of the grip 19 so as to balance with the size and shape of the lens barrel 13, which vary from one type to another of the first unit 12. Therefore, in any combination of the second unit 11 and the first unit 12, the camera 10 ensures the user to grip it in an optimum condition.

Figure 6:
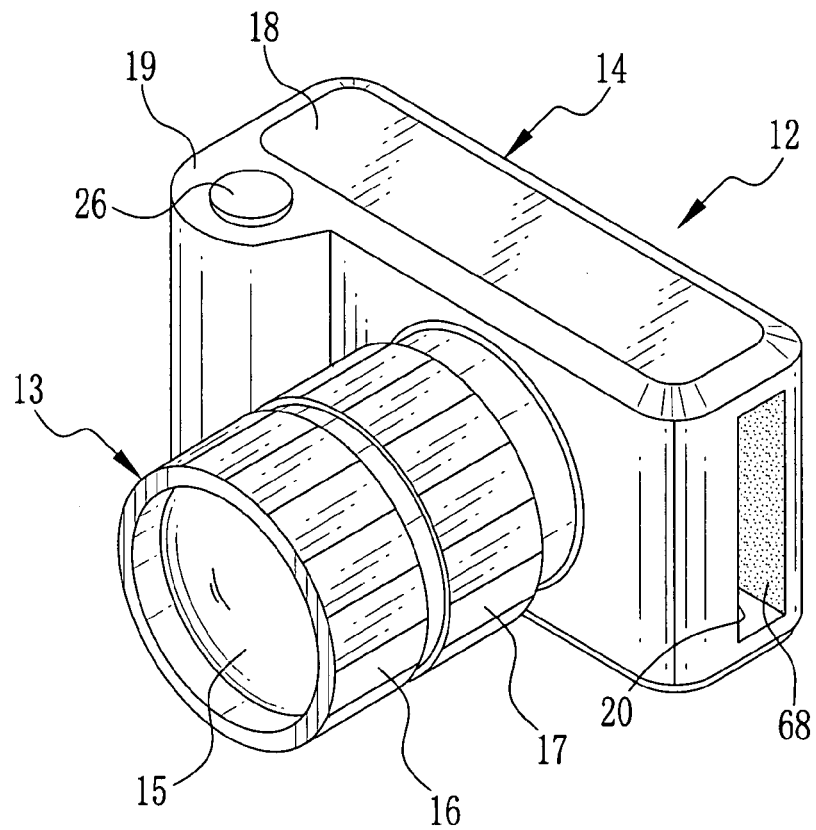
FIG. 6 is a front perspective view of a first unit of the camera, which has a cleaning cloth at an entrance of a slot for inserting the second unit.
Figure 7:
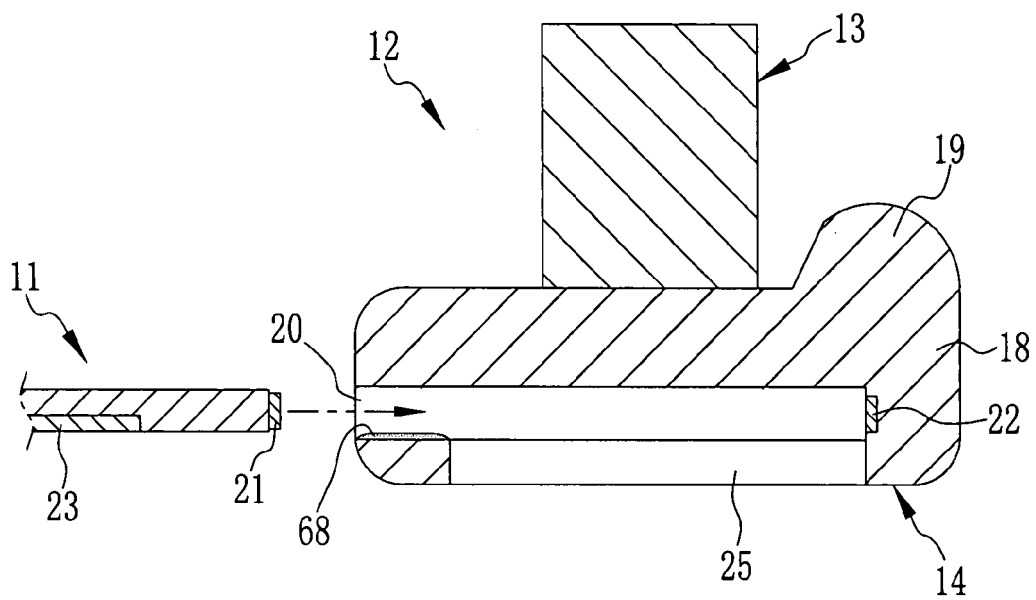
FIG. 7 is a horizontal section of the first unit with the cleaning cloth, in relation to the second unit.

It is preferable to provide a cleaning cloth 68, e.g. mohair plush, inside the slot 20, as shown in FIGS. 6 and 7. As the second unit 11 is inserted through the slot 20 into the first unit 12, the display surface of the monitor 23 brushes against the cleaning cloth 68. Thus, the cleaning cloth 68 wipes finger marks and dusts off the display surface of the monitor 23 each time the second unit 11 is inserted into the slot 20, so the surface of the monitor 23 is maintained clean.

Next other embodiments of the present invention will be described sequentially.

Figure 8:
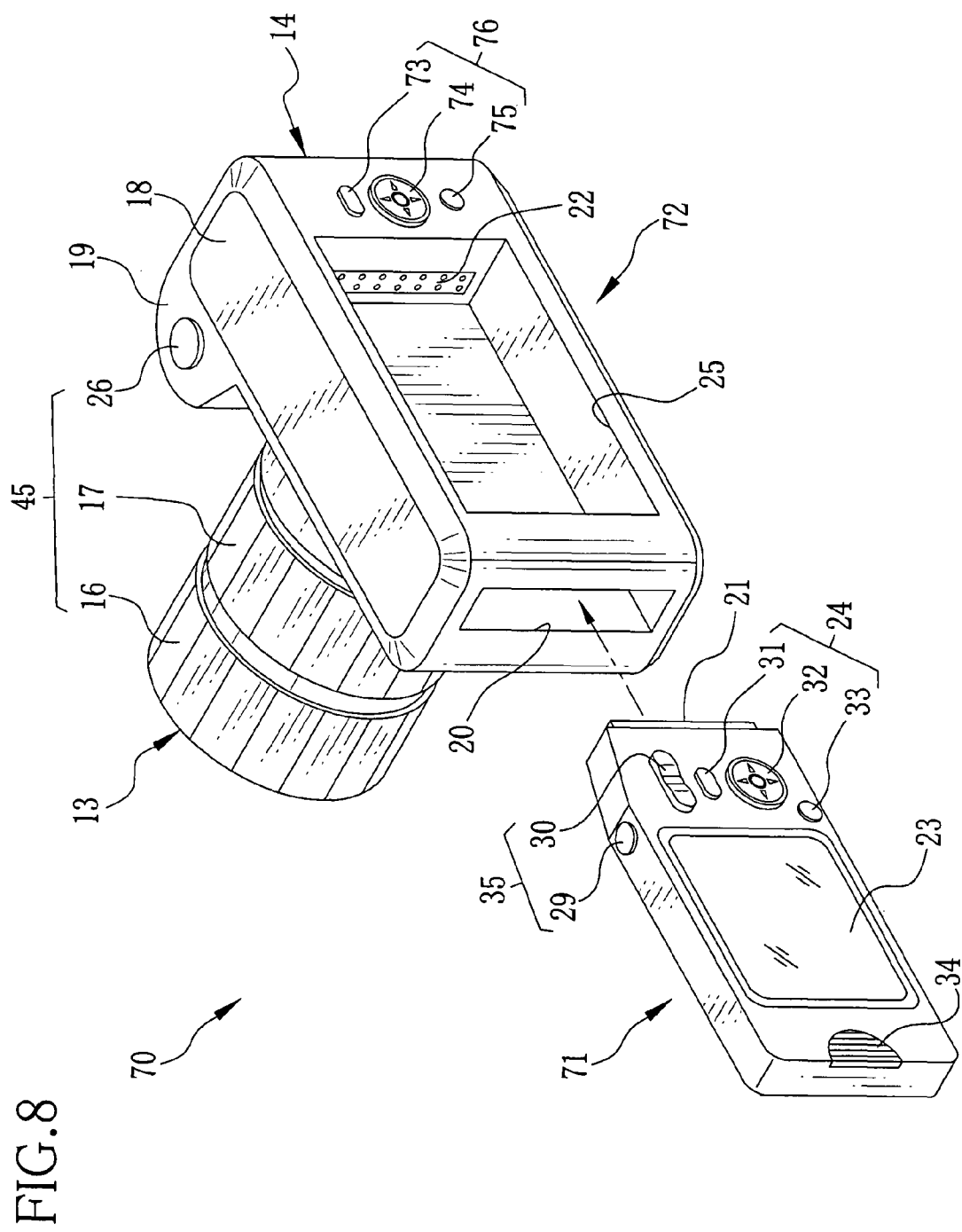
FIG. 8 is a rear perspective view of a camera according to a second embodiment.
Figure 9:
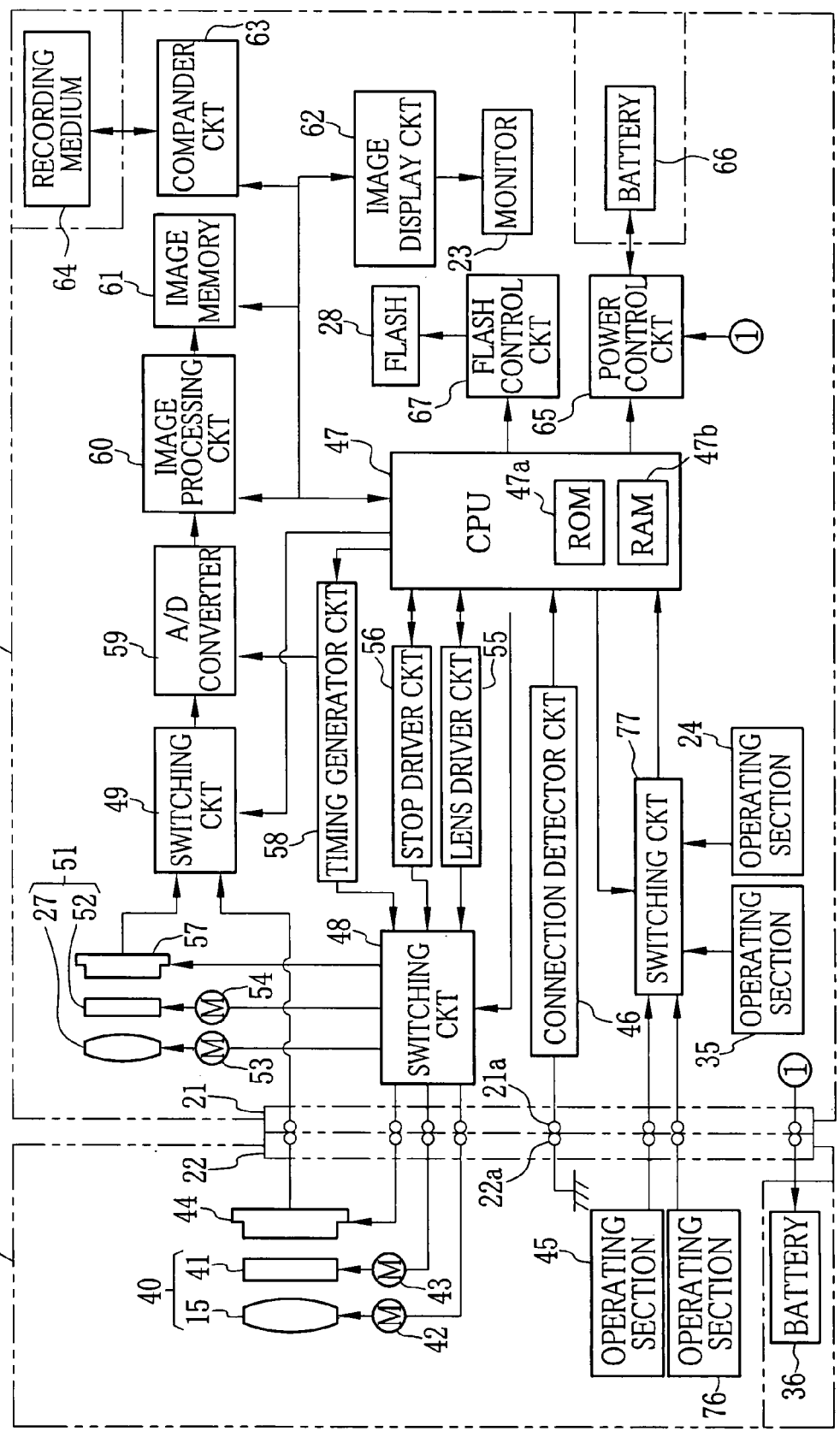
FIG. 9 is a block diagram illustrating an internal structure of the camera according to the second embodiment.

FIGS. 8 and 9 show a camera 70 of the second embodiment that consists of a first unit 72 and a second unit 71. On a rear side portion of a base body 14 of the first unit 72, there is provided the same operating section 76 as the operating section 24 of the second unit 71. The operating section 76 consists of a menu button 73, a cursor button 74 and a power button 75, and enables operating the second unit 71 from the first unit 72.

As shown in FIG. 9, a switching circuit 77 is fed with operational signals from the operating section 24 and an operating section 35 of the second unit 71, or ones from the operating section 76 and an operating section 45 of the first unit 72. The operating section 45 consists of a focusing ring 16, a zooming ring 17 and a shutter button 26. While a connection detector circuit 46 detects that the first unit 72 is connected to the second unit 71, the switching circuit 77 transfers the operational signals from the operating sections 45 and 76 to a CPU 47. While the connection detector circuit 46 does not detect the connection of the first unit 72 to the second unit 71, the switching circuit 77 transfers the operational signals from the operating sections 24 and 35 to a CPU 47. The CPU 47 controls and drives respective components based on the input operational signals. Other structures and operations are equivalent to the camera 10 of the first embodiment, so the like parts are designated by the same reference numerals as the first embodiment, and the detailed description of these parts are omitted.

Figure 10:
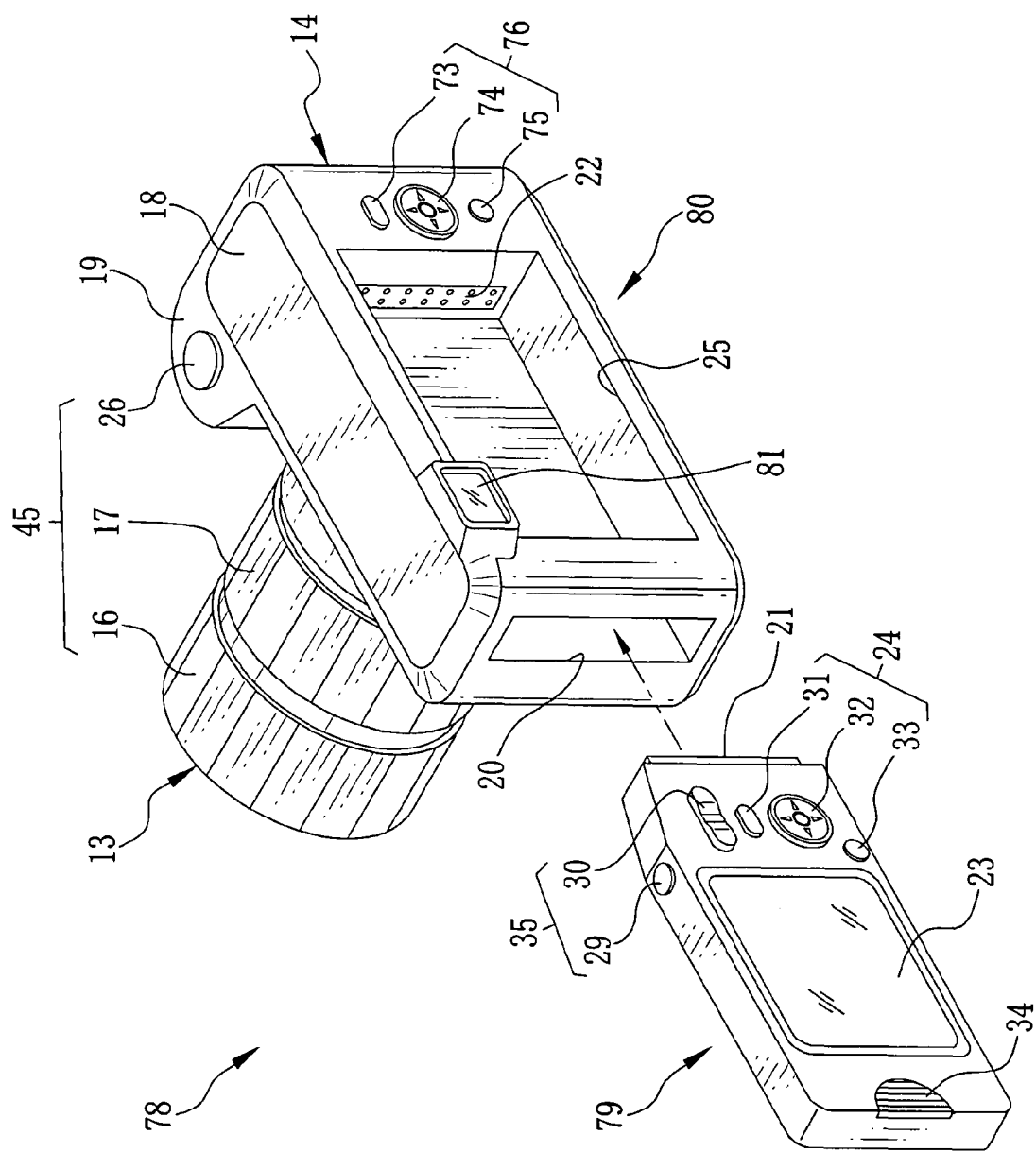
FIG. 10 is a rear perspective view of a camera according to a third embodiment.
Figure 11:
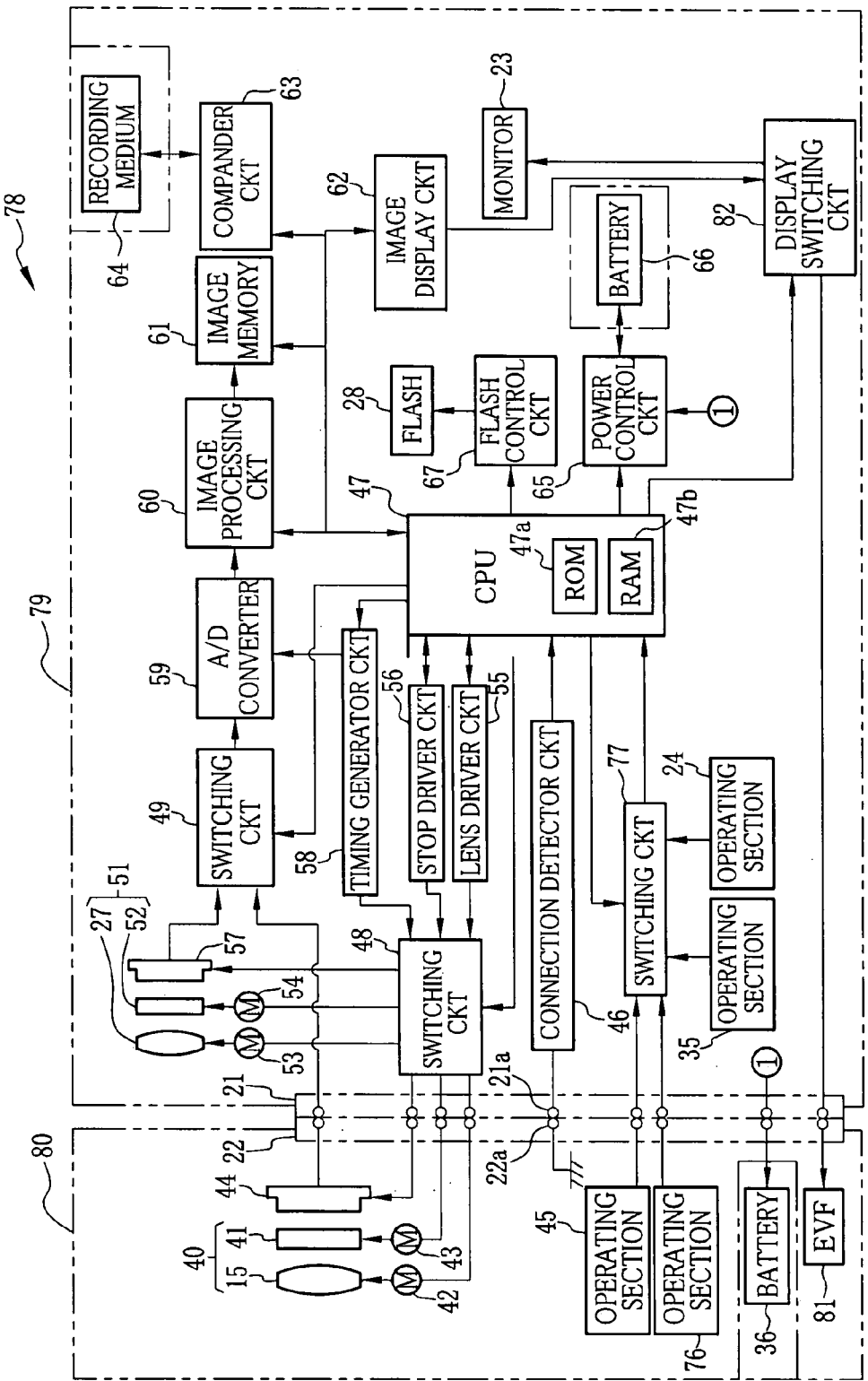
FIG. 11 is a block diagram illustrating an internal structure of the camera according to the third embodiment.

FIG. 10 shows a camera 78 of the third embodiment that consists of a second unit 79 and a first unit 80. On a rear side portion of a base body 14 of the first unit 72, there is provided an electronic viewfinder (EVF) 81. Inside the second unit 79, as shown in FIG. 11, a display switching circuit 82 is provided for switching whether an image display signal outputted from an image display circuit 62 is to be sent to a monitor 23 or to the EVF 81 through connectors 21 and 22. The display switching circuit 82 switches over between the monitor 23 and the EVF 81 according to the operation on the operating section 24 or 76. Other structures and operations are equivalent to the camera 70 of the second embodiment, so the like parts are designated by the same reference numerals as the second embodiment, and the detailed description of these parts are omitted.

Where the second unit 79 is connected to the first unit 80, to use the camera 78 as a single-reflex digital camera, the user can shoot a picture while holding a grip 19 and a lens barrel 13 in the same manner as shown in FIG. 4, and looking into the EVF 81 as displaying the camera-through images.

Figure 12:
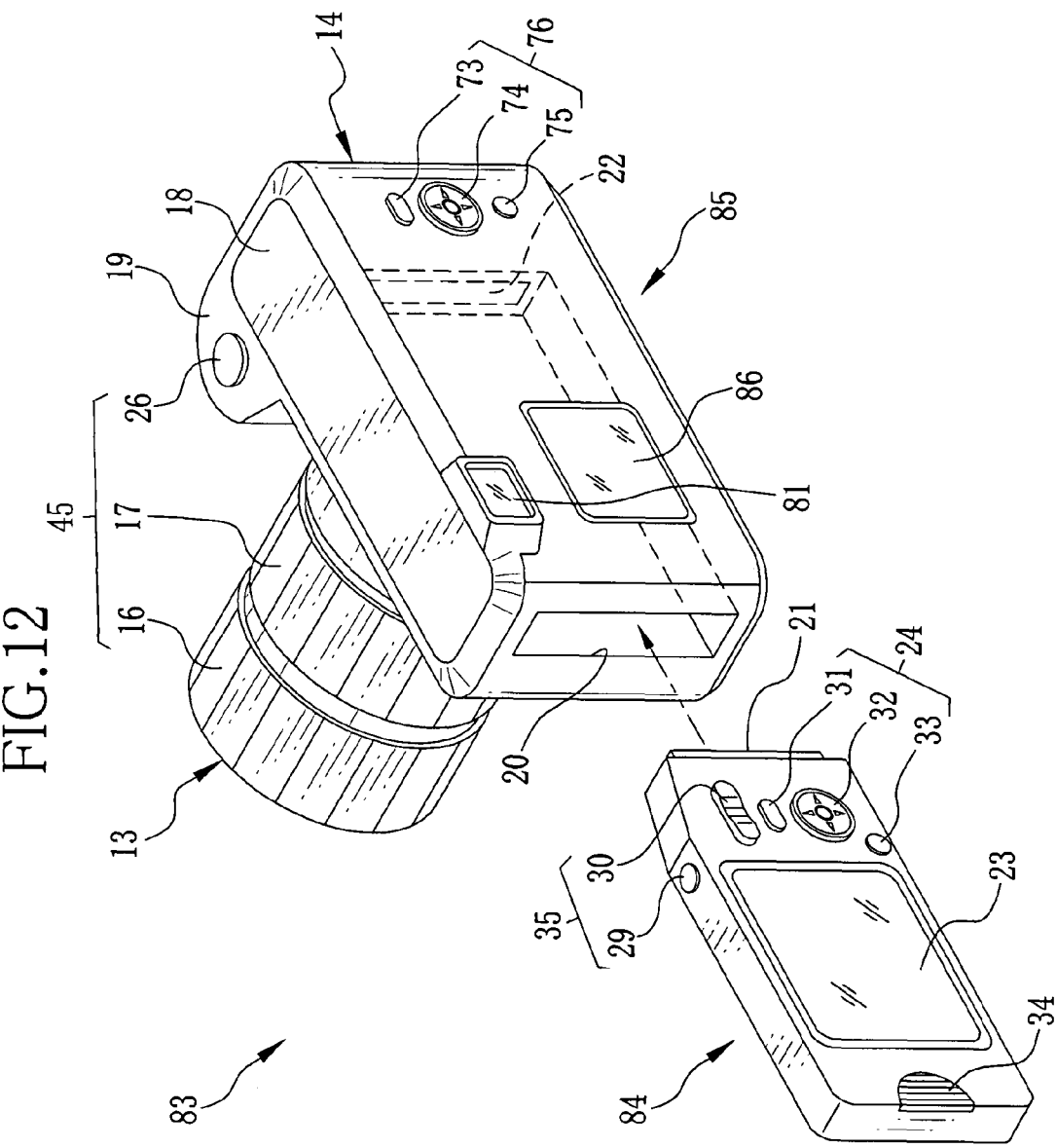
FIG. 12 is a rear perspective view of a camera according to a fourth embodiment.
Figure 13:
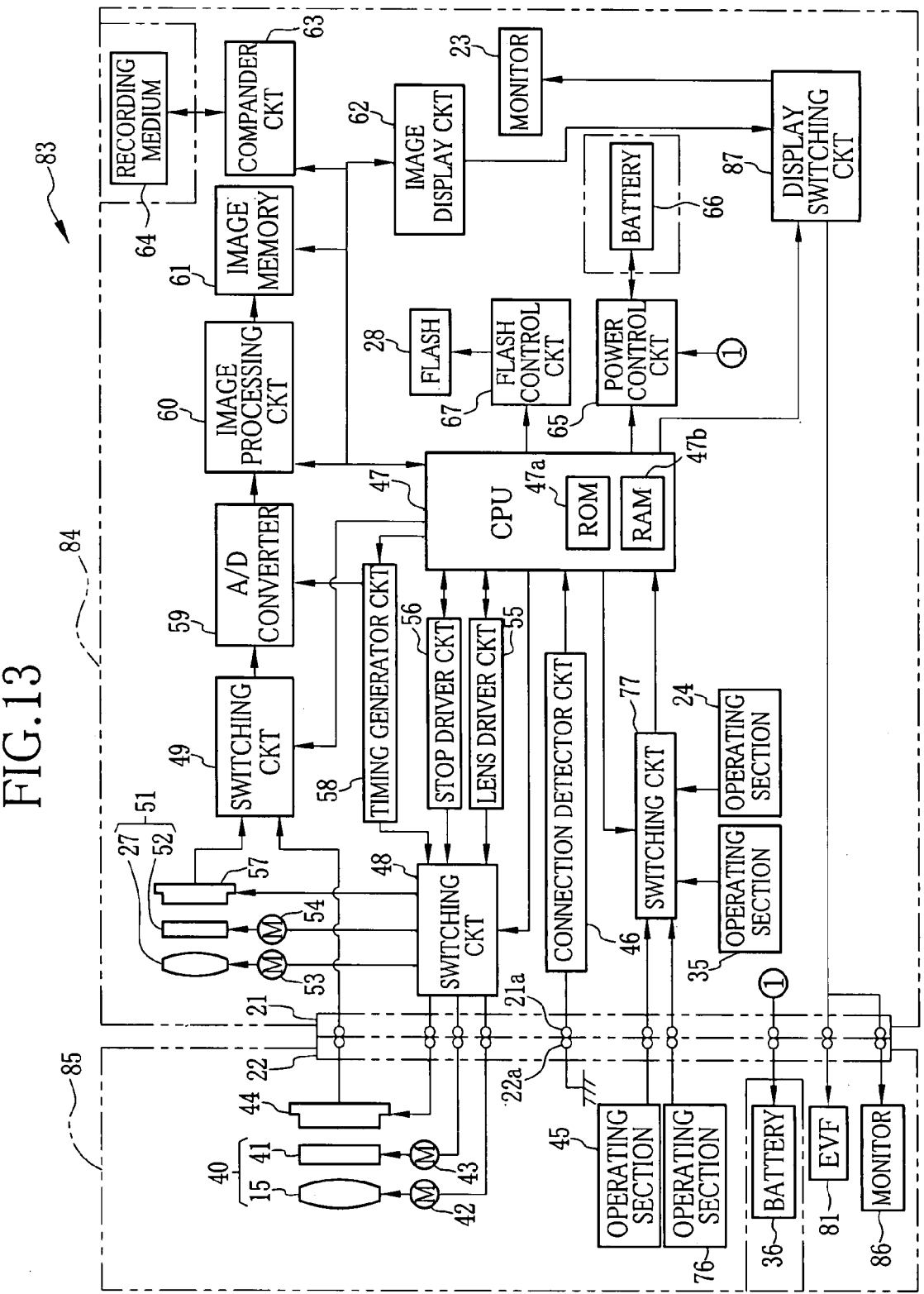
FIG. 13 is a block diagram illustrating an internal structure of the camera according to the fourth embodiment.

FIG. 12 shows a camera 83 of the fourth embodiment that consists of a first unit 85 and a second unit 84. On a rear side portion of a base body 14 of the first unit 85, there is provided a monitor 86 instead of the opening 25 that is provided in the above embodiments. Inside the second unit 84, as shown in FIG. 13, a display switching circuit 87 is provided for switching whether an image display signal outputted from an image display circuit 62 is to be fed to a monitor 23 or to the monitor 86 and an electronic view finder (EVF) 81 through connectors 21 and 22. The display switching circuit 87 is controlled by a CPU 47, to feed the image display signal to the EVF 81 and the monitor 86 while the first unit 85 is connected to the second unit 84. The display switching circuit 87 feeds the image display signal to the monitor 23 while the first unit 85 is not connected to the second unit 84. Other structures and operations are equivalent to the third embodiment, so the like parts are designated by the same reference numerals as the third embodiment, and the detailed description of these parts are omitted.

Because the camera 83 switches over from the image display device of the second unit 84 to the image display device of the first unit 85 when the second unit 84 is connected to the first unit 85, the user can use the proper image display device for the camera type, i.e. the single-reflex camera and the compact camera in this embodiment. Note that it is possible to provide the first unit 85 with either one of the EVF 81 and the monitor 86 if it is convenient.

Figure 14:
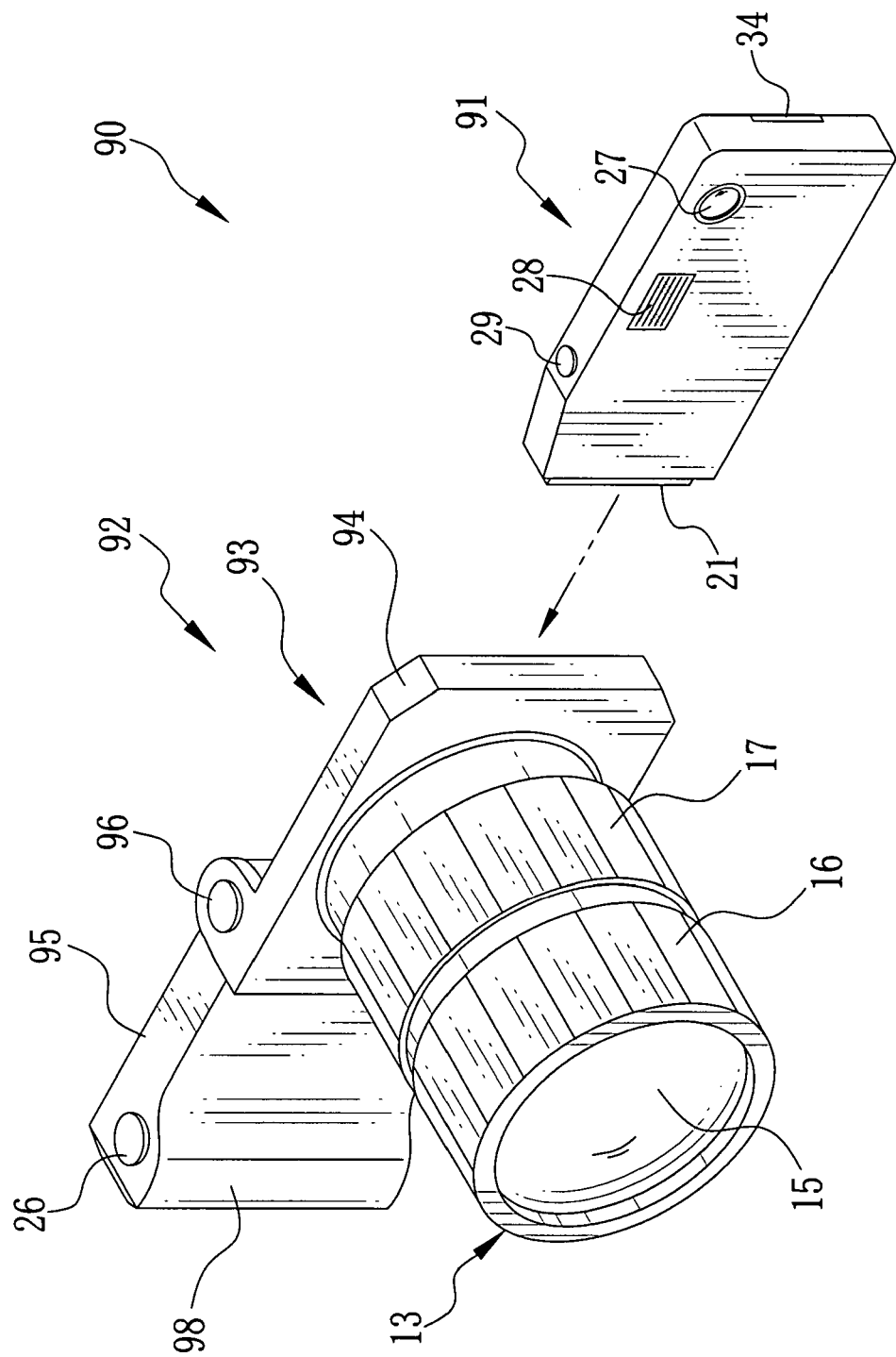
FIG. 14 is a front perspective view of a camera according to a fifth embodiment, wherein a second unit attaching portion is hinged to a lens barrel holding portion of a first unit.
Figure 15:
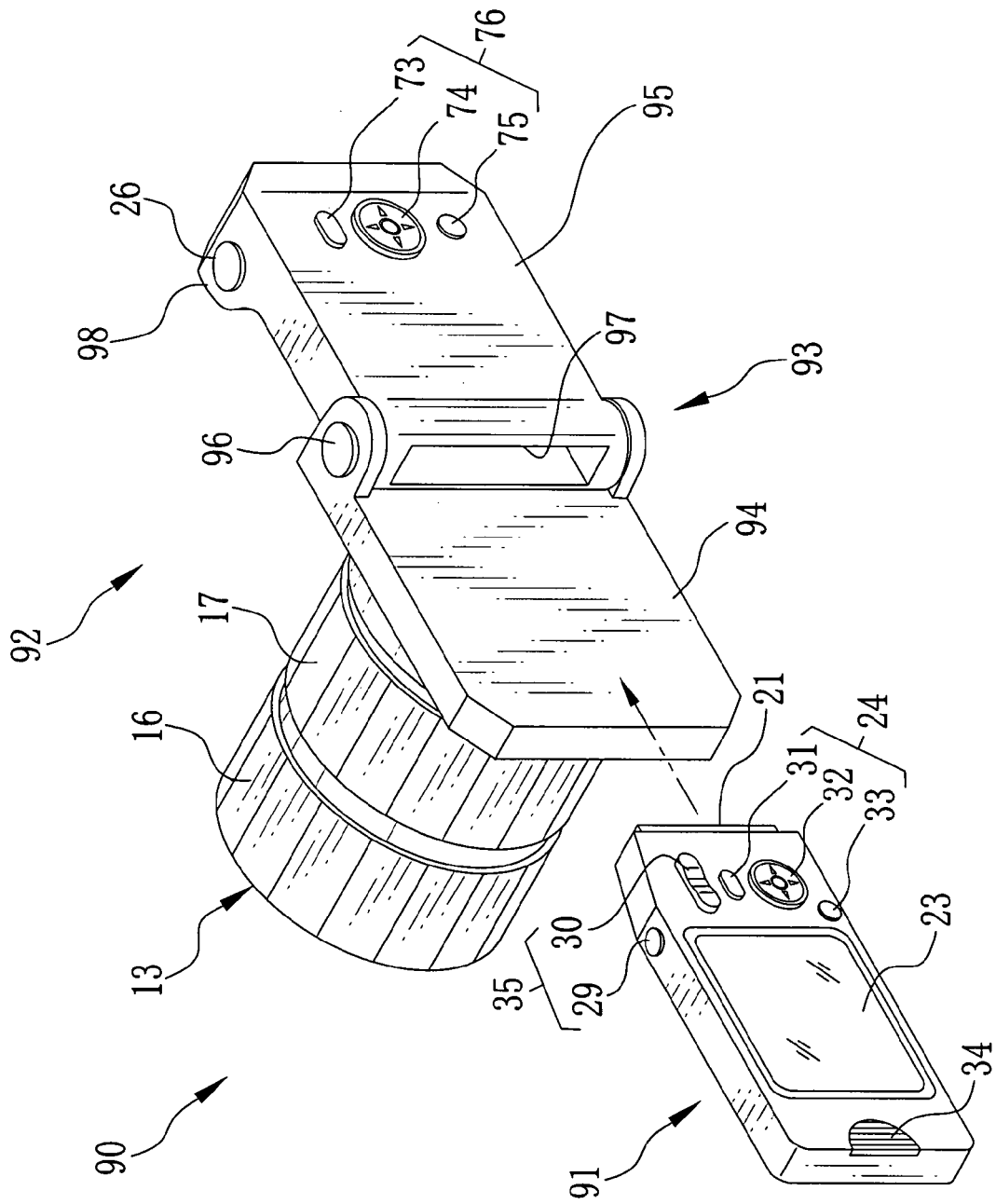
FIG. 15 is a rear perspective view of the camera according to the fifth embodiment.

FIGS. 14 and 15 shows a camera 90 of the fifth embodiment that consists of a second unit 91 and an interchangeable first unit 92. The first unit 92 has a base body 14 consisting of a lens barrel holding portion 94 that is affixed to a rear end of a lens barrel 13, and a camera body connecting portion 95 that is coupled at one end to one end of the lens barrel holding portion 94 through a hinge mechanism 96. The lens barrel holding portion 94 and the second unit connecting portion 95 are similar in size and shape to each other (flat rectangular prism shape). The second unit connecting portion 95 can swing about the hinge mechanism 96 between an open position shown in FIGS. 14 and 15 and a closed position shown in FIGS. 16 and 17. In the closed position, the second unit connecting portion 95 is placed behind the lens barrel 13 in mate with the lens barrel holding portion 94.

The second unit connecting portion 95 has a slot 97 formed through the end having the hinge mechanism 96, and the second unit 91 is inserted into the slot 97. A connector 22 is provided inside the slot 97, so a connector 21 of the second unit 91 is electrically connected to the connector 22 as the second unit 91 is fully inserted into the slot 97. The second unit connecting portion 95 has a forwardly convex grip portion 98 formed on an opposite end to the slot 97 and the hinge mechanism 96, and a shutter button 26 is provided on a top surface of the grip portion 98. The second unit connecting portion 95 also has an operating section 76 like the second to fourth embodiments, on the opposite side to the grip portion 98. When the second unit connecting portion 95 is closed, the side having the operating section 76 is opposed to the lens barrel holding portion 94, so the operating section 76 is covered and protected with the lens barrel holding portion 94. Also the slot 97 is covered with the lens barrel holding portion 94 in the closed position of the second unit connecting portion 95.

Figure 18:
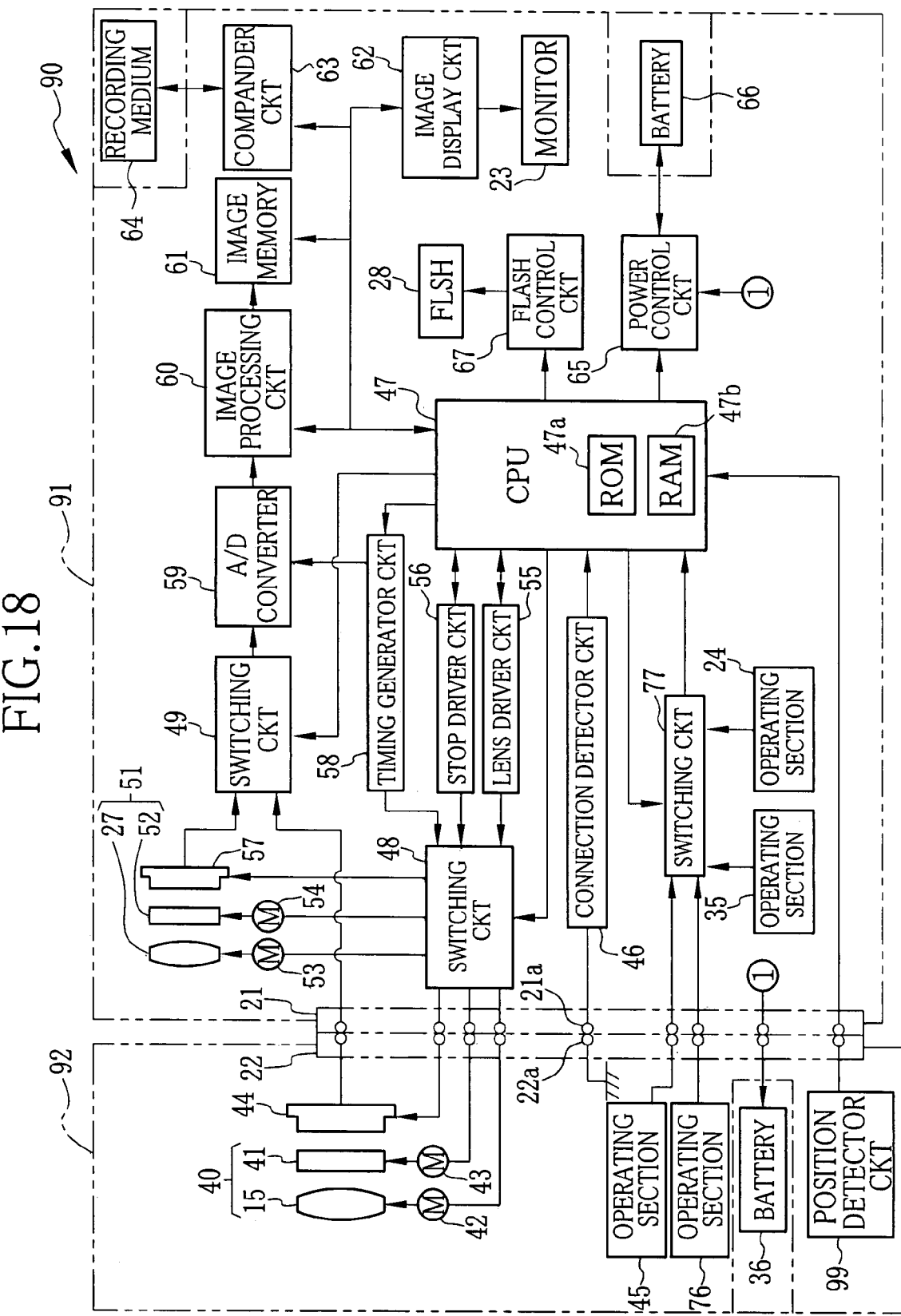
FIG. 18 is a block diagram illustrating an internal structure of the camera of the fifth embodiment.

As shown in FIG. 18, a position detector circuit 99, e.g. a rotary switch, is provided in the first unit 92, for detecting a rotational position of the second unit connecting portion 95. A detection signal outputted from the position detector circuit 99 is fed through the connectors 21 and 22 to a CPU 47. Based on the detection signal, the CPU 47 validates or activates operating sections 45 and 76 of the first unit 92 while the second unit connecting portion 95 is in the open position. Other structures and operations are equivalent to the second embodiment, so the like parts are designated by the same reference numerals as the second embodiment, and the detailed description of these parts are omitted.

Figure 19:
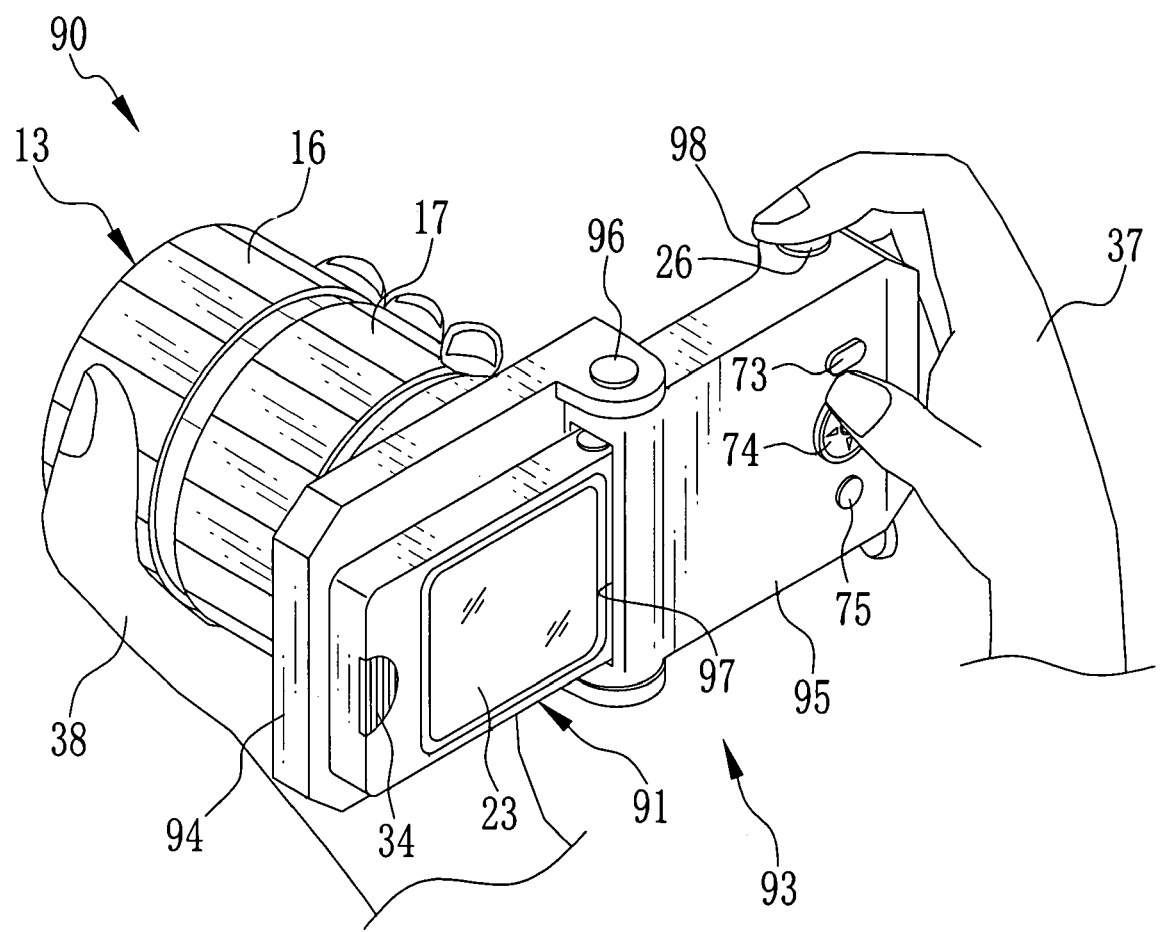
FIG. 19 is a rear perspective view of the camera of the fifth embodiment in a condition used as a single-reflex digital camera.

To use the camera 90 as a single-reflex digital camera, the second unit connecting portion 95 is set to the open position and the second unit 91 is inserted into the slot 97, as shown in FIG. 19. Then the connectors 21 and 22 are connected to each other, and a front of the second unit 91 having a taking lens 27 as a light receiving member is covered with the lens barrel holding portion 94, whereas operating sections 24 and 35 of the second unit 91 are hidden in the slot 97. As the user holds the grip portion 98 by the right hand 37 and the lens barrel 13 by the left hand 38, the camera 90 is held properly and stably, so the camera shake is reduced. The monitor 23 displays the images of the subject taken through the first unit 92, sequentially as the moving camera-through images. While looking at the camera-through images, the user makes focusing and zooming respectively by turning the focusing ring 16 and the zooming ring 17 with the left hand 38, and presses the shutter button 26 by the index finger of the right hand 37.

Figure 16:
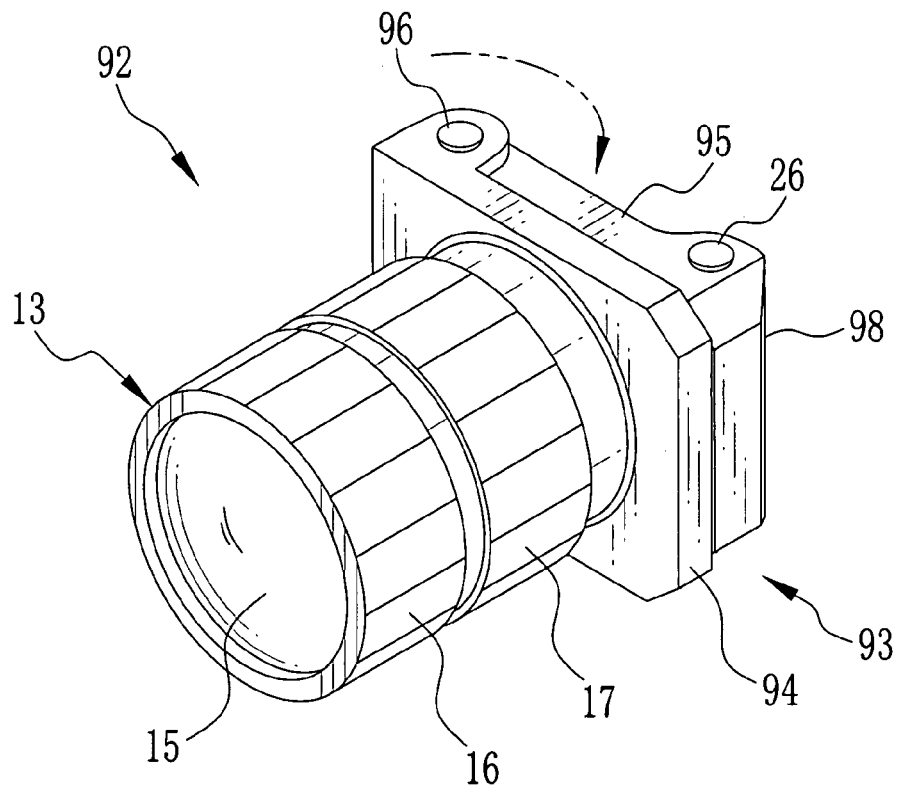
FIG. 16 is a front perspective view of the camera of the fifth embodiment, in a position where the second unit attaching portion is closed.
Figure 17:
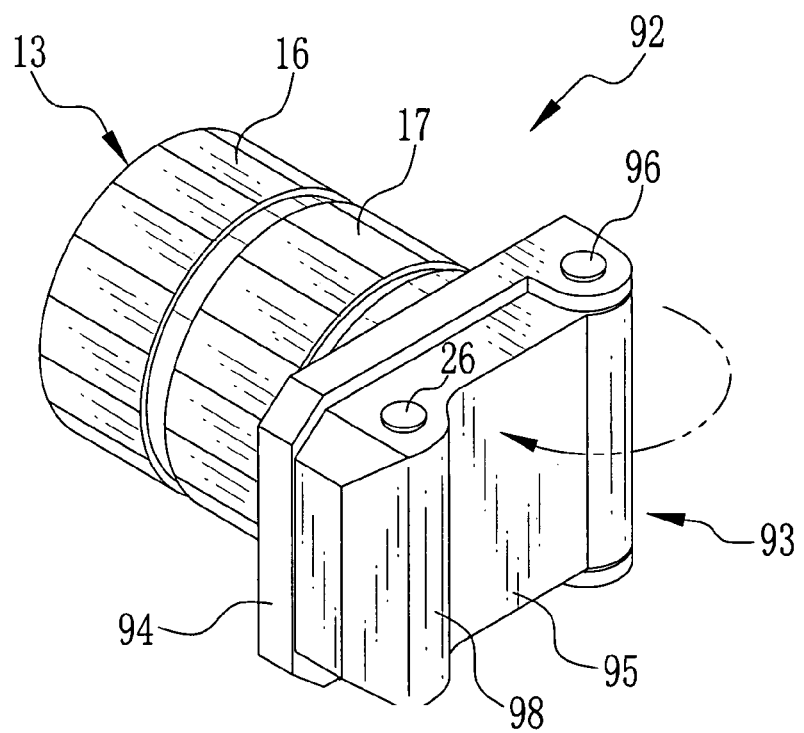
FIG. 17 is a rear perspective view of the camera of the fifth embodiment, in a position where the second unit attaching portion is closed.

To detach the second unit 91 from the first unit 92, the anti-slip member 34 is protruded out of the slot 20, so the user can pinch the second unit 11 at the anti-slip member 34 and draw the second unit 11 out of the first unit 12. After the second unit 91 is removed, the base body 93 of the first unit 92 can be made compact by rotating the second unit connecting portion 95 to the closed position, as shown in FIGS. 16 and 17. Thus, the handiness and portability of the first unit 92 is improved.

Figure 20:
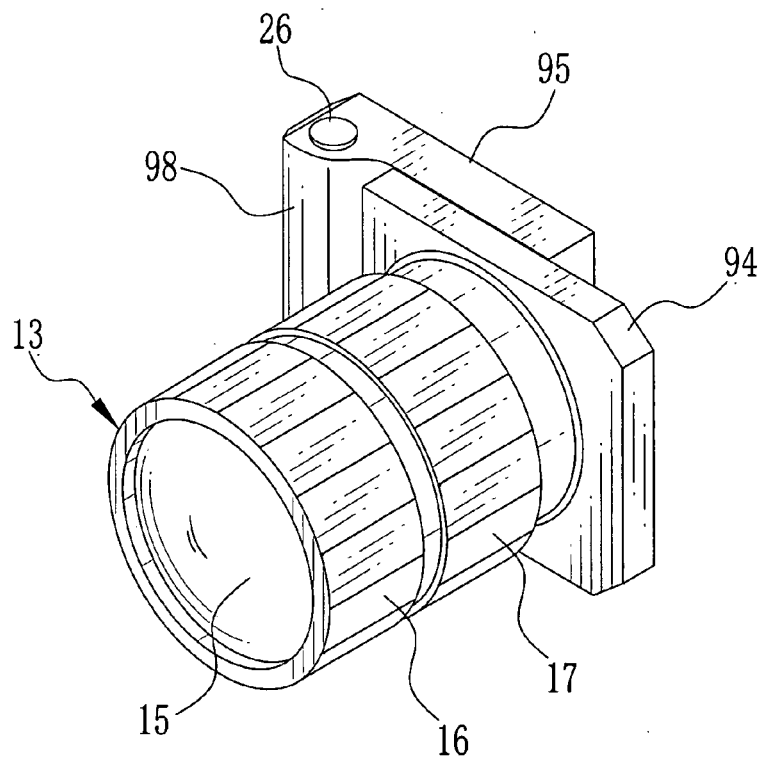
FIG. 20 is a front perspective view of a camera of a sixth embodiment, in a position where a sliding second unit attaching portion is closed.
Figure 21:
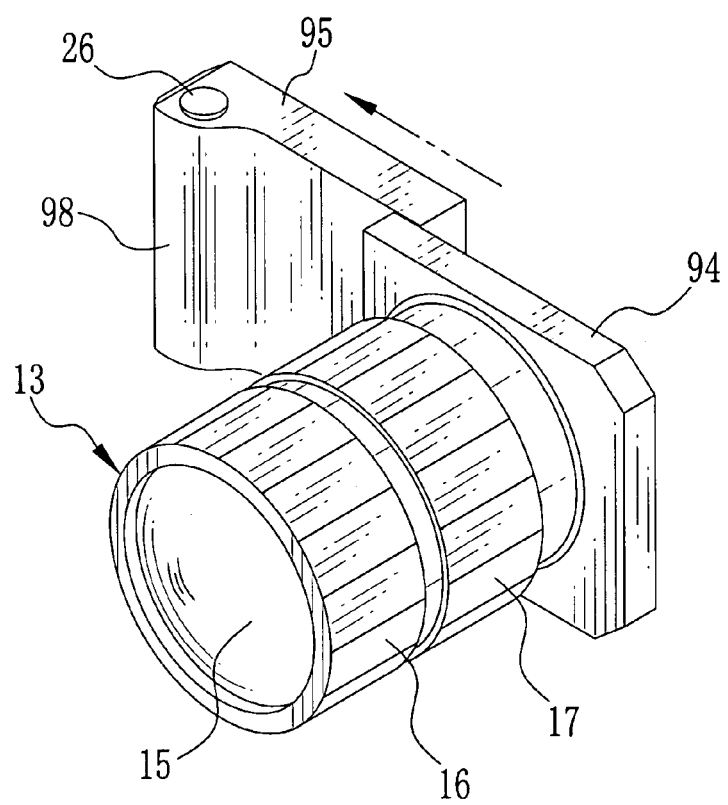
FIG. 21 is a front perspective view of the camera of the sixth embodiment, in a position where the second unit attaching portion is slid to an open position.

Although the lens barrel holding portion 94 and the second unit connecting portion 95 are coupled through the hinge mechanism 96 in the above embodiment, it is possible to couple them through a not-shown slider mechanism, as shown in FIGS. 20 and 21. FIG. 20 shows a closed position where the second unit connecting portion 95 covers a rear surface of the lens barrel holding portion 94, whereas FIG. 21 shows an open position where the second unit connecting portion 95 is slid sidewise to its farthest position from the lens barrel holding portion 94. Internal structure of this embodiment may be substantially equal to the structure shown in FIG. 18, so the operating sections 45 and 76 of the first unit 92 are validated while the second unit connecting portion 95 is in the open position.

Figure 22:
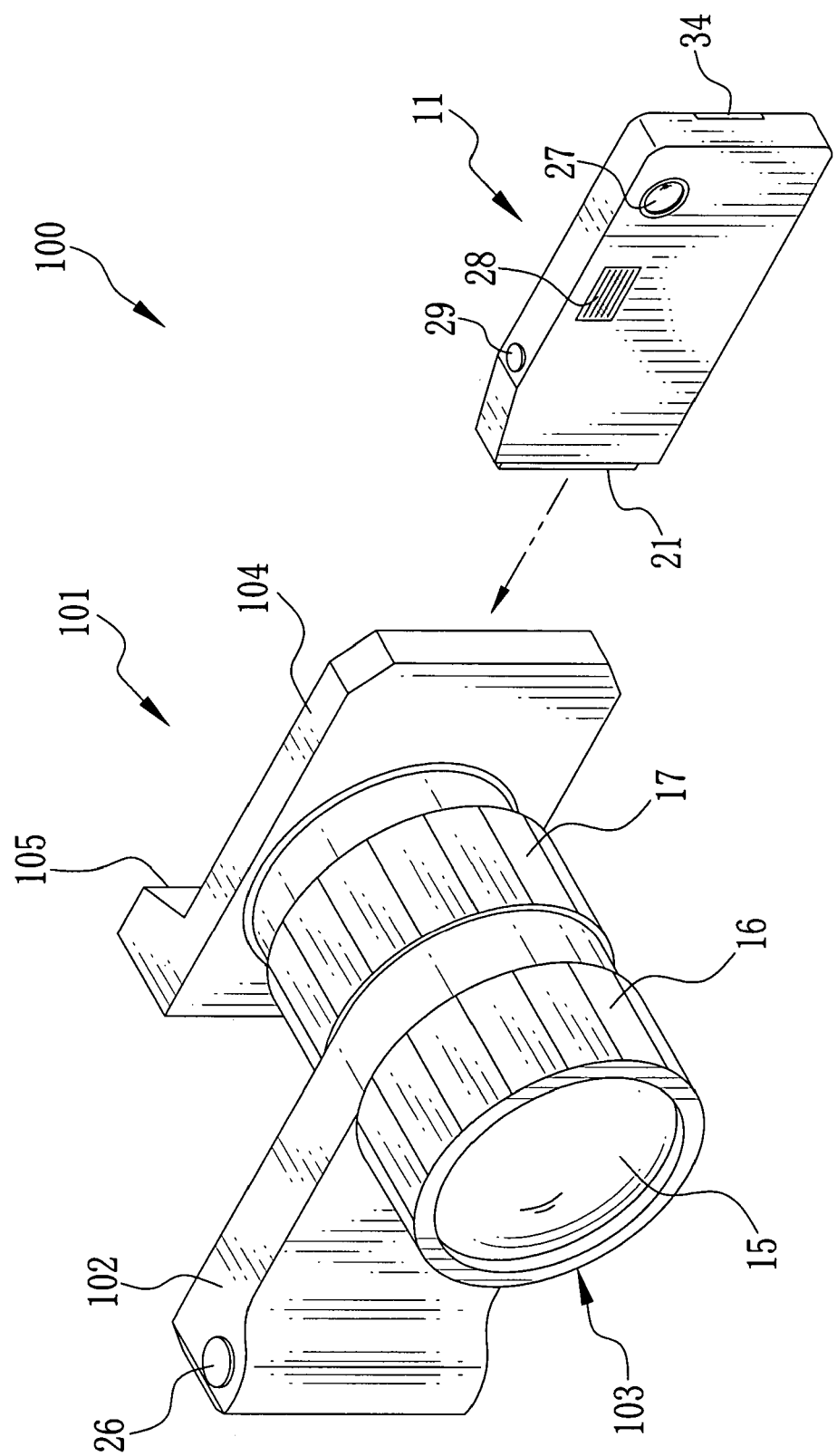
FIG. 22 is a front perspective view of a camera according to a seventh embodiment of the present invention.
Figure 23:
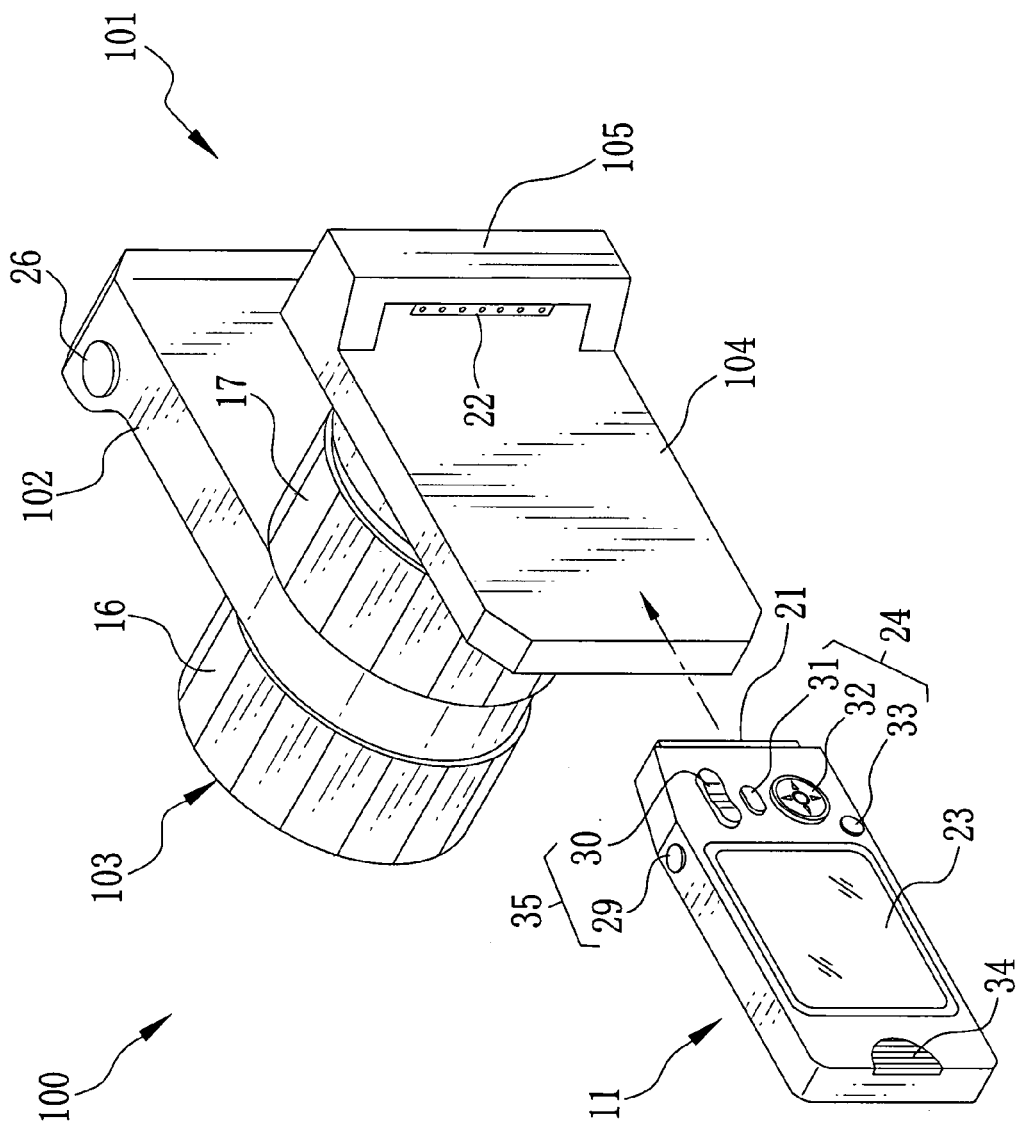
FIG. 23 is a rear perspective view of the camera according to the seventh embodiment.
Figure 24:
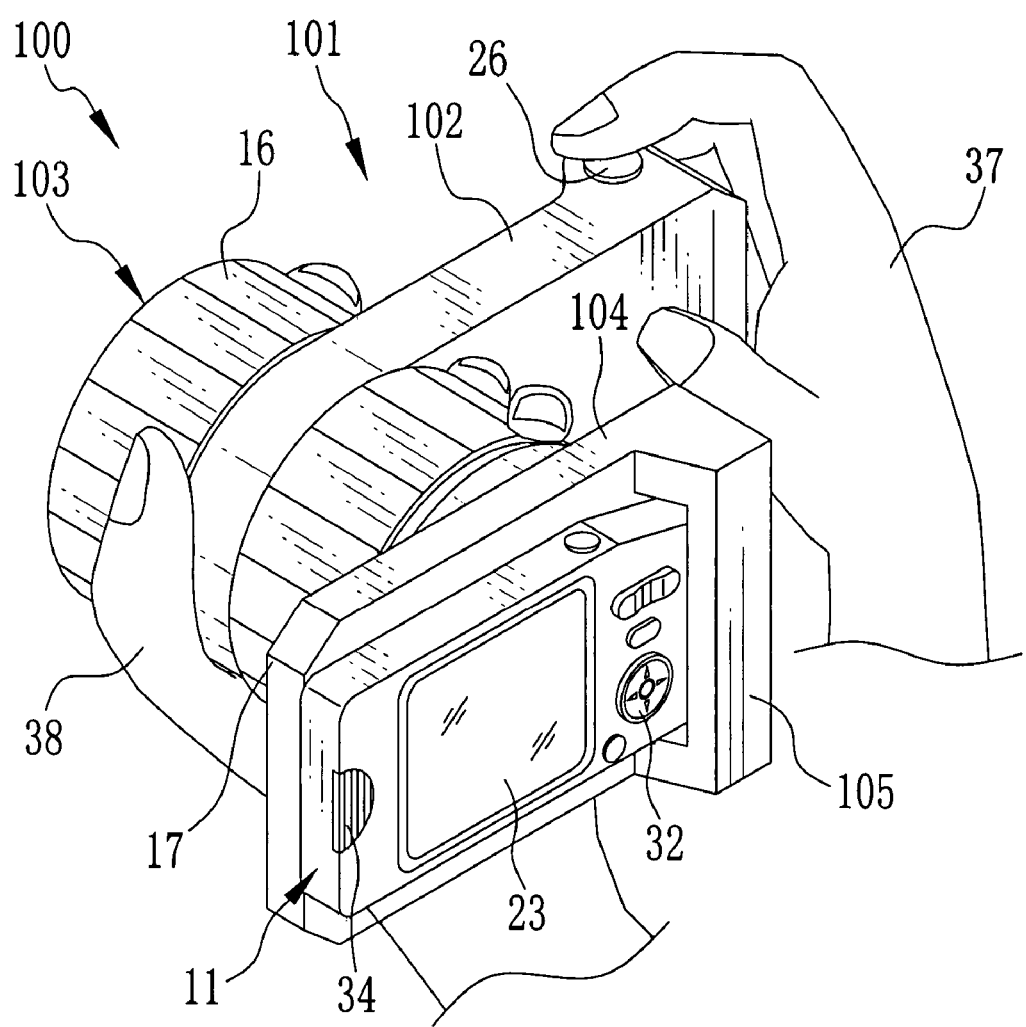
FIG. 24 is a rear perspective view of the camera of the seventh embodiment in a condition used as a single-reflex digital camera.

FIGS. 22 to 24 show a camera 100 of the sixth embodiment that consists of a camera body 11 and a lens unit 101. The second unit 11 is equal to that described in the first embodiment, whereas the first unit 101 is provided with a lens barrel 103 having a grip member 102 formed integrally therewith. The grip member 102 is a planer member having a forwardly convex portion on one end, and the other end is joined to a lens barrel 103 at a position between a focusing ring 16 and a zooming ring 17. A shutter button 26 is disposed on a top surface of the grip member 102.

A rear end of the lens barrel 103 is secured to a base body 104, and a rear end of the base body 104 is provided with a camera body connecting portion 105 for connecting the second unit 11 to the first unit 101. The second unit connecting portion 105 is provided with a connector 22 that is connectable to a connector 21 of the second unit 11. The grip member 102 is located in a gravity center of the first unit 101 in a direction of an optical axis, or a gravity center of the camera 100 where the second unit 11 is connected to the first unit 101. Internal structure of the camera 100 is equivalent to the first embodiment shown in FIG. 3, so the description of the internal structure is omitted.

To use the camera 100 as a single-reflex digital camera, the second unit 11 is connected to the second unit connecting portion 105, as shown in FIG. 24. Then the user holds the grip 102 by the right hand 37 and the lens barrel 103 by the left hand 38, so the camera 10 is held properly and stably. Since the grip member 102 is so located that the user may hold the camera 100 around its center of gravity, the camera shake is more effectively prevented, and the load on the hands is reduced.

Although the above-described embodiments use the connectors 21 and 22 that are constituted of a number of male and female pins, as a connection device for connecting the first unit and the second unit mechanically and electrically, the connection device is not limited to the above embodiments but may be another mechanism. Communication of the electric signals, such as the control signal, picture signal and power control signal, between the first unit and the second unit may be done through a contactless communication, such as radio, infrared, proximity or near field communication. It is also possible to adopt a hybrid communication whereby some of electric signals are sent and received through the connectors and others through the contactless communication.

Although the second unit can be drawn out of the first unit while pinching the second unit at the anti-slip member in the above embodiments, it is preferable to provide a lock mechanism that stops the second unit from being removed off the first unit while the camera is powered on. The lock mechanism cooperates with the power button to unlock the connection between the second unit and the first unit when the power of the camera is turned off.

In the above embodiments, the connection between the second unit and the first unit is detected through the electric contact inside the connectors. Instead, it is possible to use a mechanical switch, an optical sensor or a magnetic sensor for this purpose.

Although the grip and the operating sections, including the shutter button and the menu button, are disposed on user's right-hand side, for the general convenience of right-handed users, the positions of the grip and the operating sections may be modified according to the user.

In the above embodiments, so long as the second unit is connected to the first unit, the shutter button of the second unit is deactivated and only the operational signal from the shutter button of the first unit is accepted. However, it is possible to use a lens unit without a shutter button, and make the shutter button of the second unit operable directly or indirectly even while the second unit is connected to the first unit.

Thus, the present invention is not to be limited to the above embodiments but, on the contrary, various modifications will be possible without departing from the scope of claims appended hereto.

What is claimed is:

1. A camera comprising:
a first unit comprising a first imaging section; and
a second unit removably connectable to said first unit, said second unit comprising a driving device for driving said first imaging section to capture images while said first unit is connected to said second unit, a second imaging section being driven by said driving device to capture images while said first unit is not connected to said second unit, and a device for recording data of images as captured by said first and second imaging sections in a recording medium;
wherein said second unit further comprises a first image display device for displaying images as captured by said first or second imaging section or images recorded in said recording medium; and
wherein said first unit comprises a lens barrel having said first imaging section mounted therein and a second unit connecting portion at which said second unit is connected to said first unit, said second unit connecting portion is provided with a cleaning device for wiping a display surface of said first image display device while said second unit is being connected to said first unit.

2. A camera as recited in claim 1, wherein said first unit further comprises a second image display device for displaying images as captured by said first or second imaging section or images recorded in said recording medium.

3. A camera as recited in claim 2, wherein a display surface of said second image display device is visible from outside while said first unit is connected to said second unit.

4. A camera as recited in claim 2, wherein said second unit further comprises a connection detector for detecting that said second unit is connected to said first unit, and a switching device for switching between said first image display device and said second image display device so that said second image display device is activated while said connection detector detects that said second unit is connected to said first unit, and that said first image device is activated while said connection detector does not detect that said second unit is connected to said first unit.

5. The camera as recited in claim 1, wherein said first unit further comprises an opening for exposing a part of said second unit.

* * * * *